Nov. 19, 1963     E. G. ENGMAN     3,110,928
APPARATUS FOR MAKING LARGE HOLLOW ARTICLES
Filed Aug. 11, 1960     14 Sheets-Sheet 1
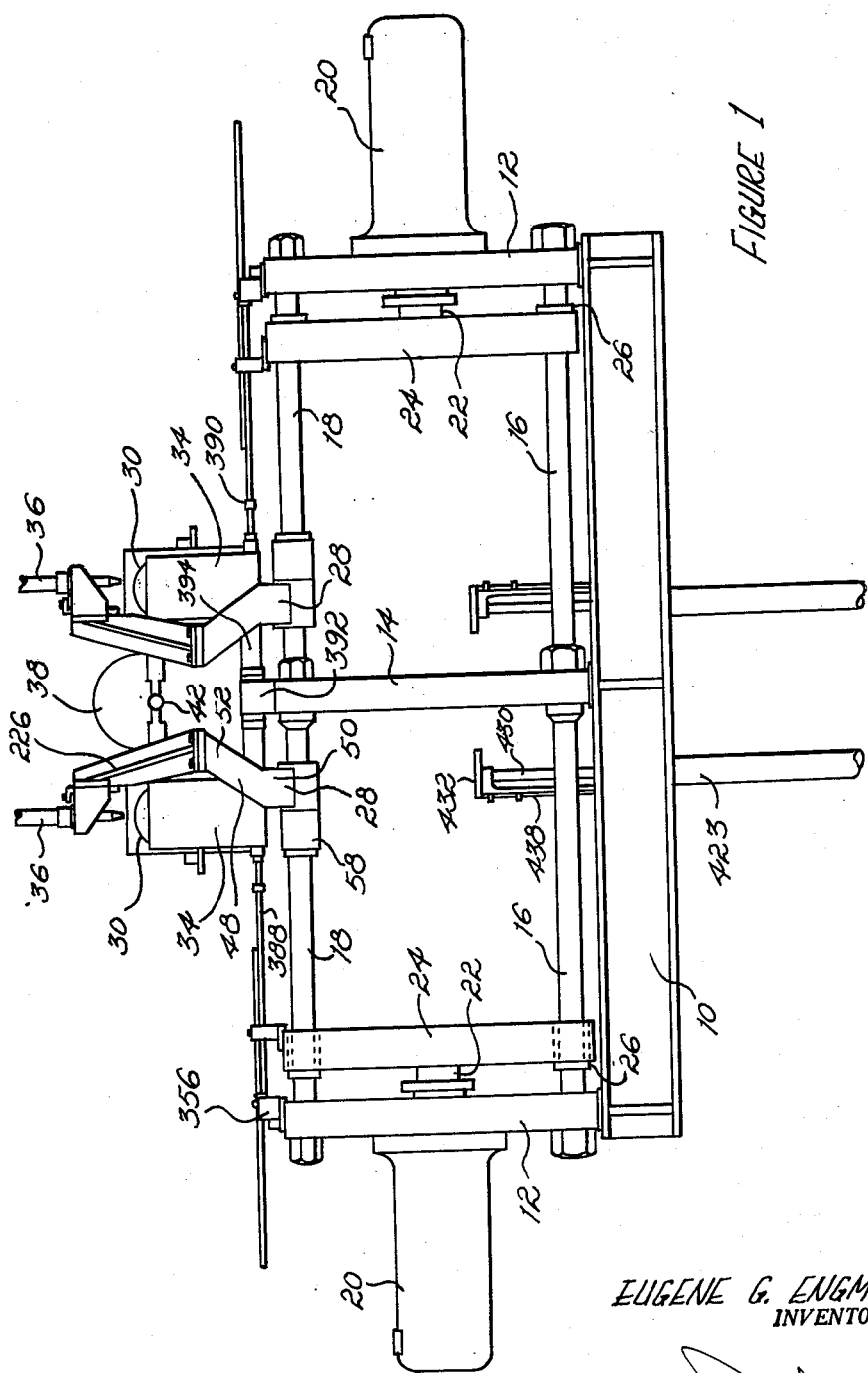
EUGENE G. ENGMAN
INVENTOR.

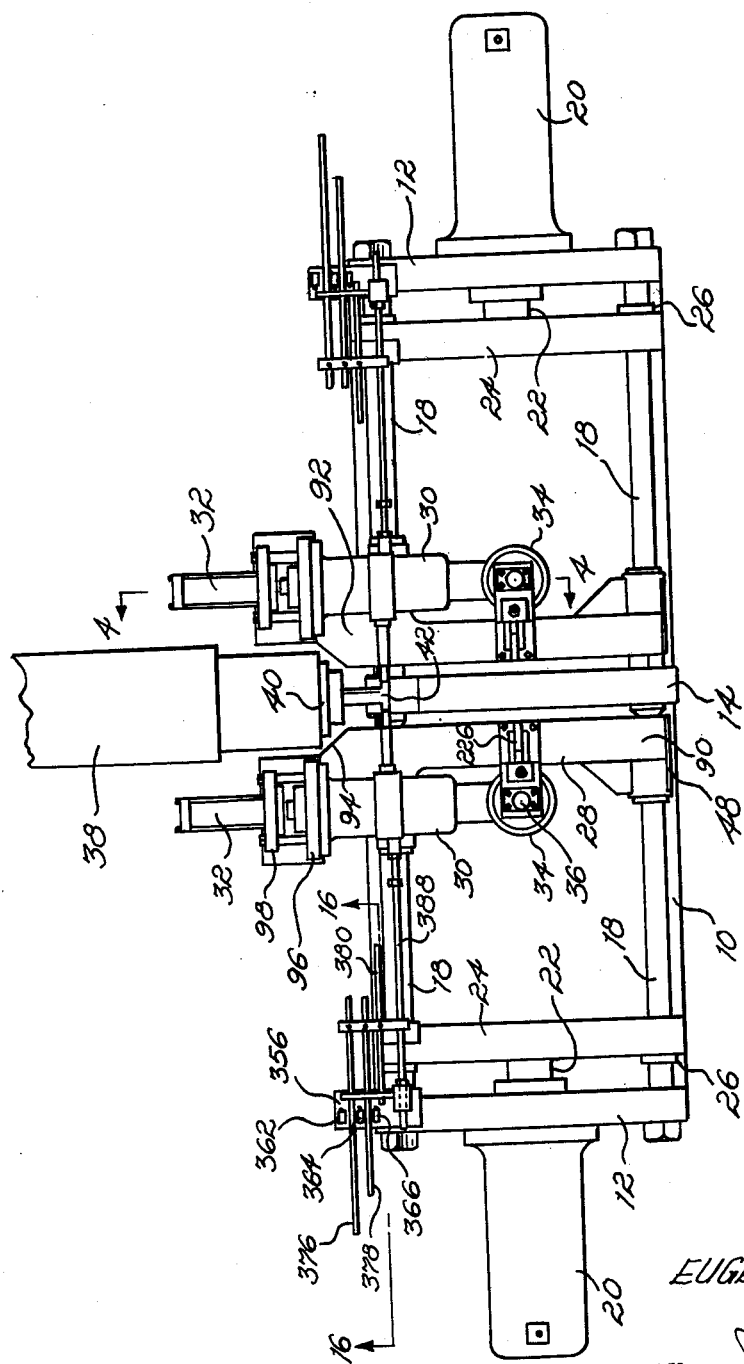

Nov. 19, 1963     E. G. ENGMAN     3,110,928
APPARATUS FOR MAKING LARGE HOLLOW ARTICLES
Filed Aug. 11, 1960     14 Sheets-Sheet 3
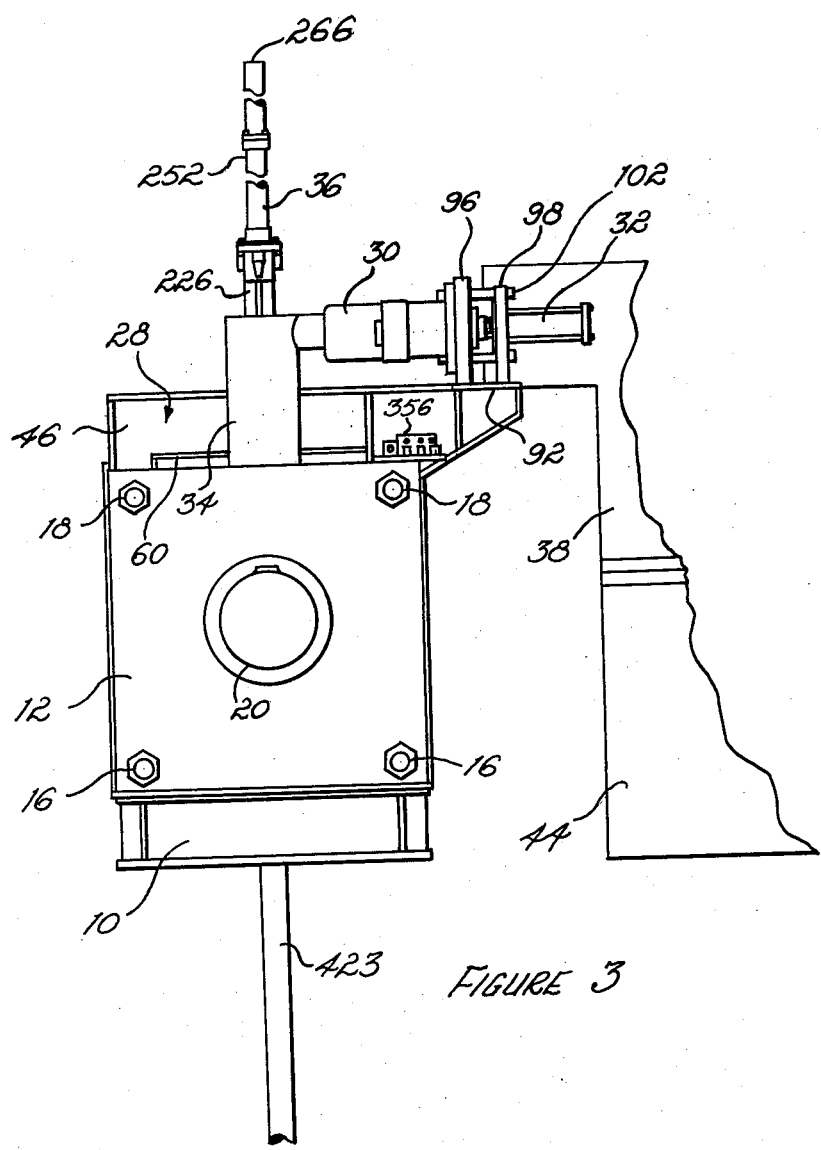

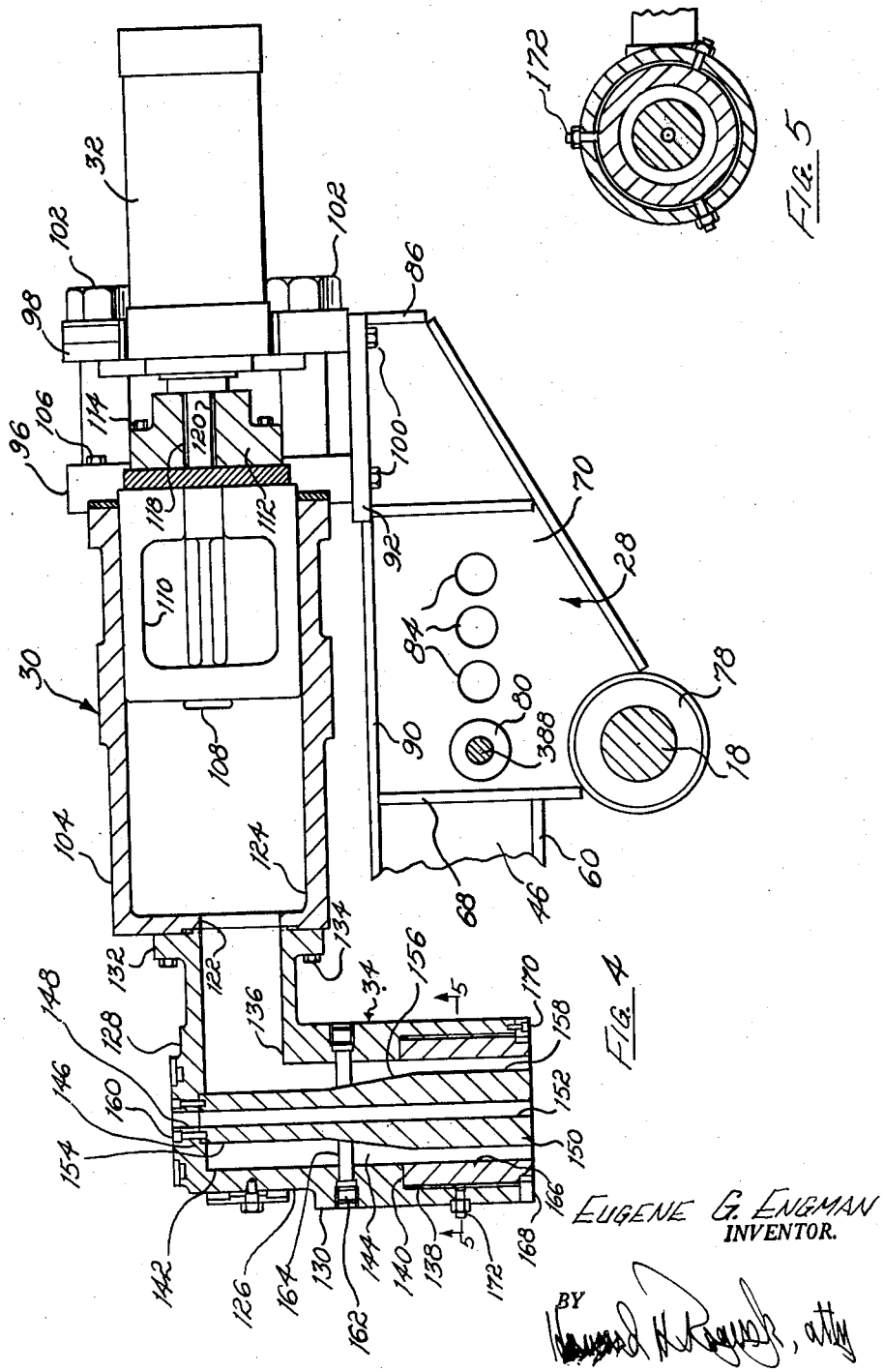

Nov. 19, 1963 E. G. ENGMAN 3,110,928
APPARATUS FOR MAKING LARGE HOLLOW ARTICLES
Filed Aug. 11, 1960 14 Sheets-Sheet 5

EUGENE G. ENGMAN
INVENTOR.

BY

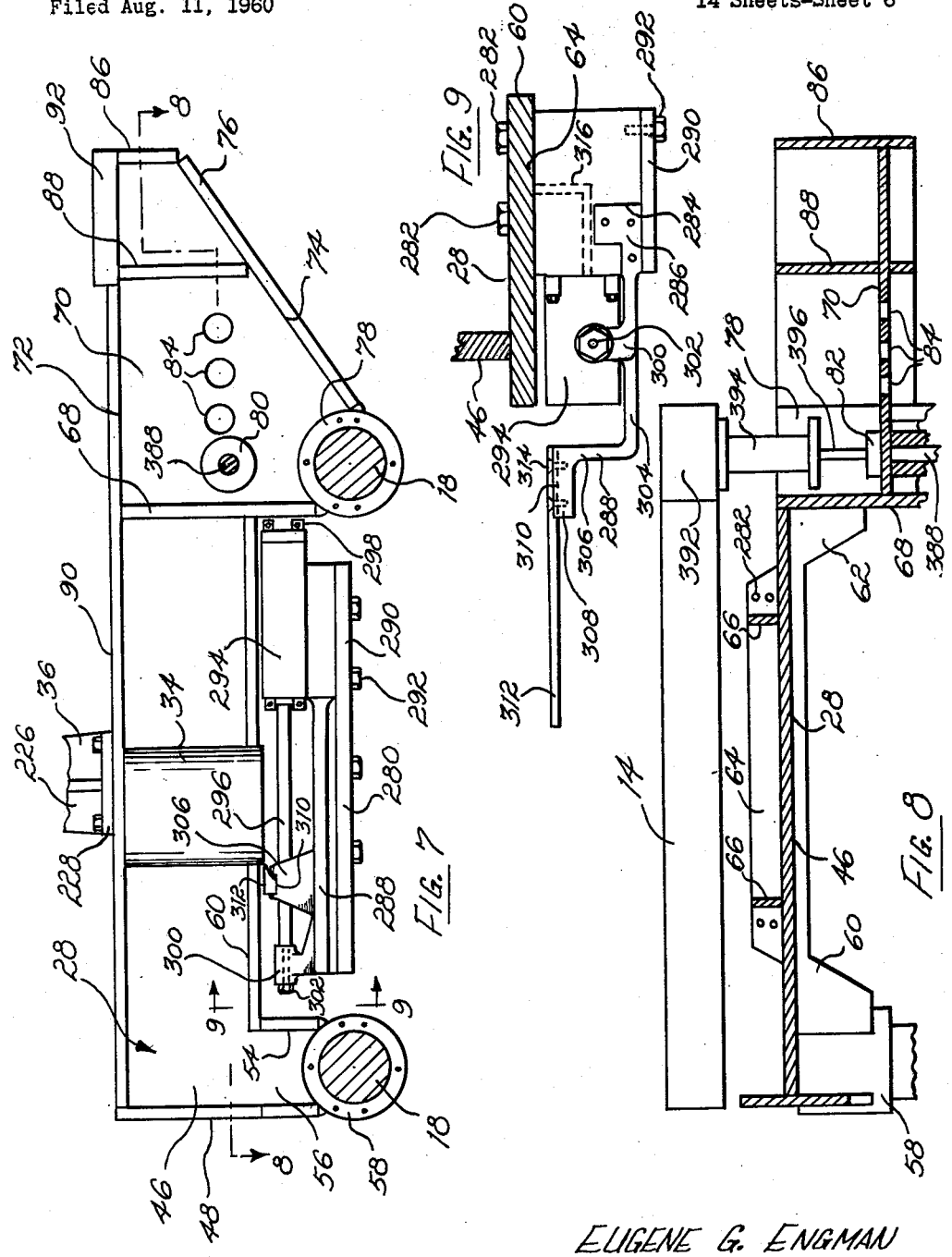

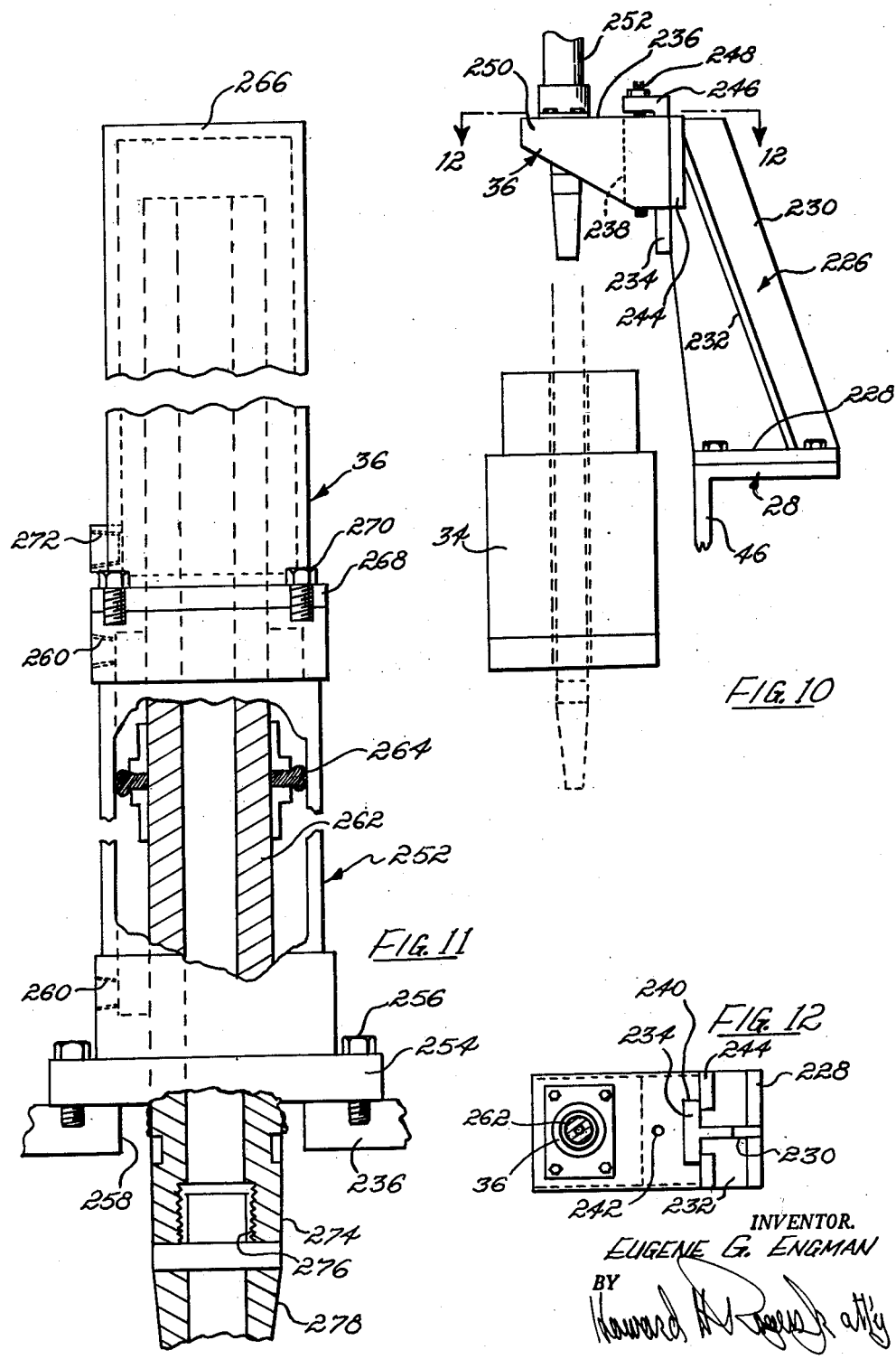

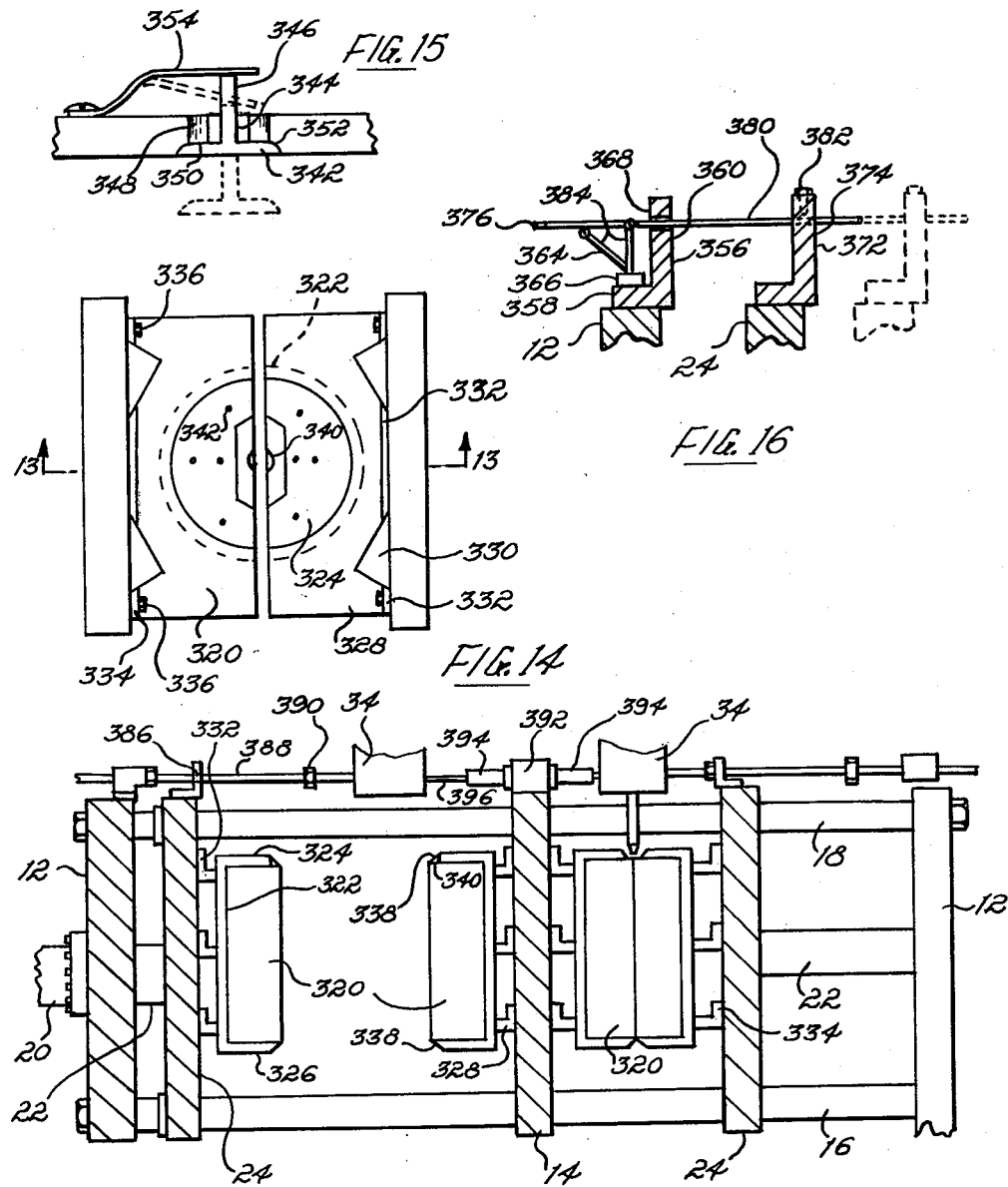

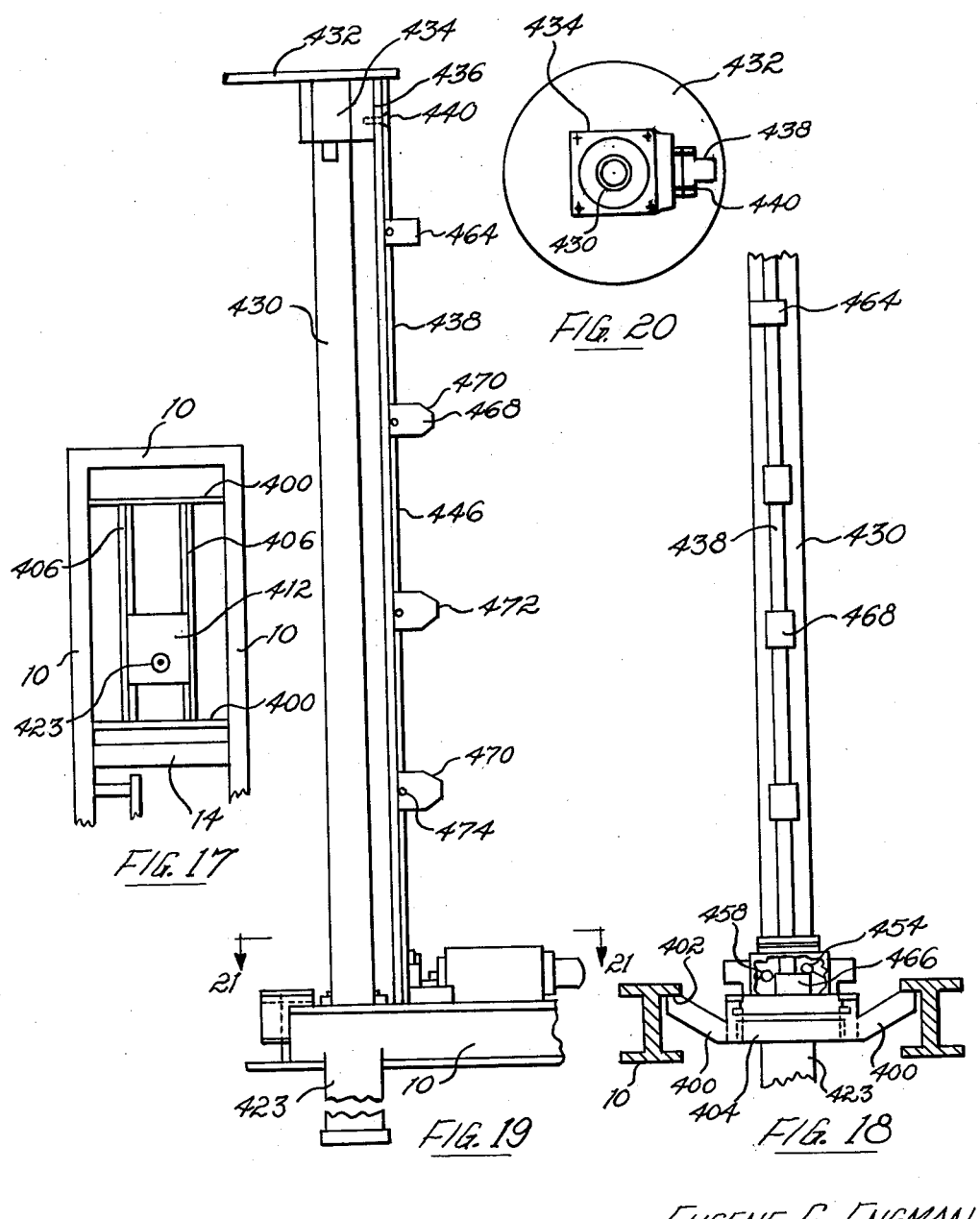

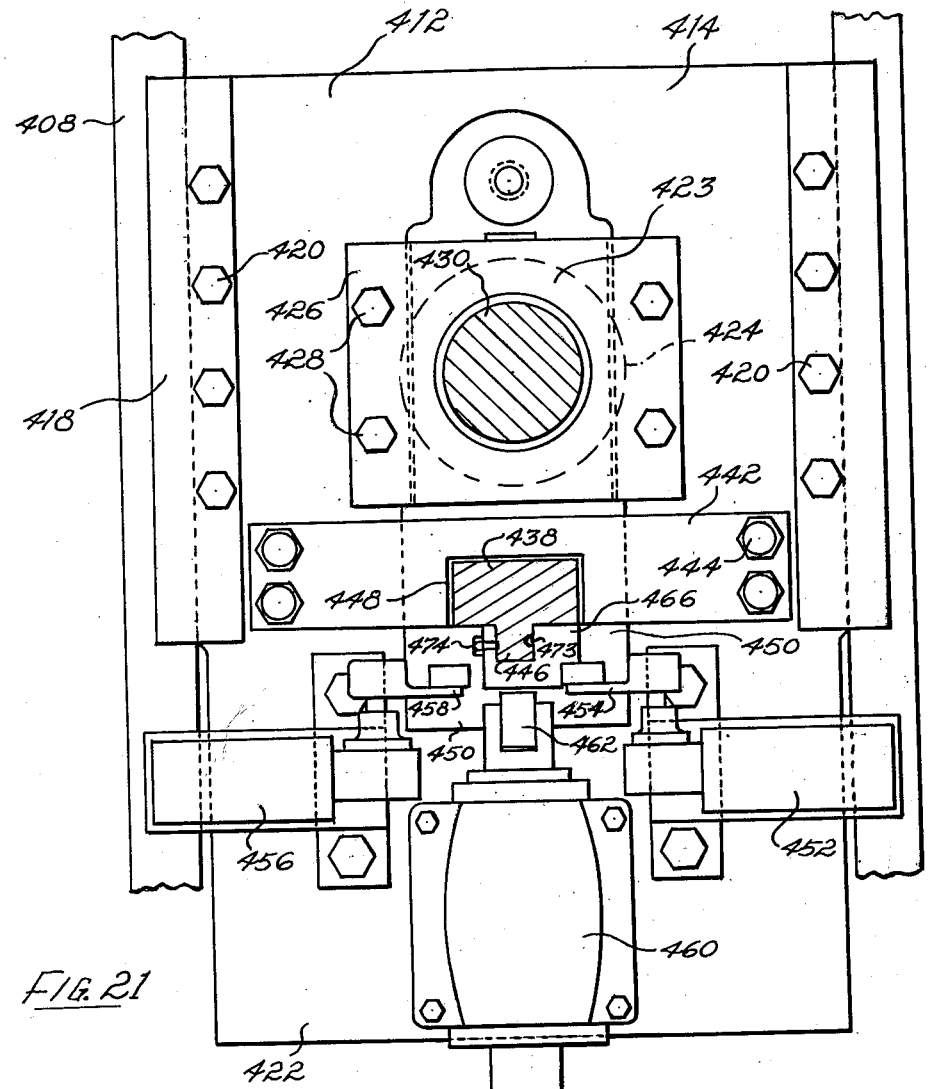
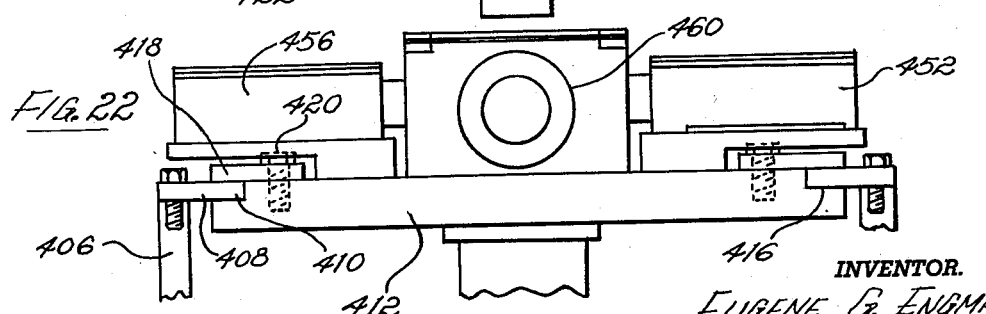

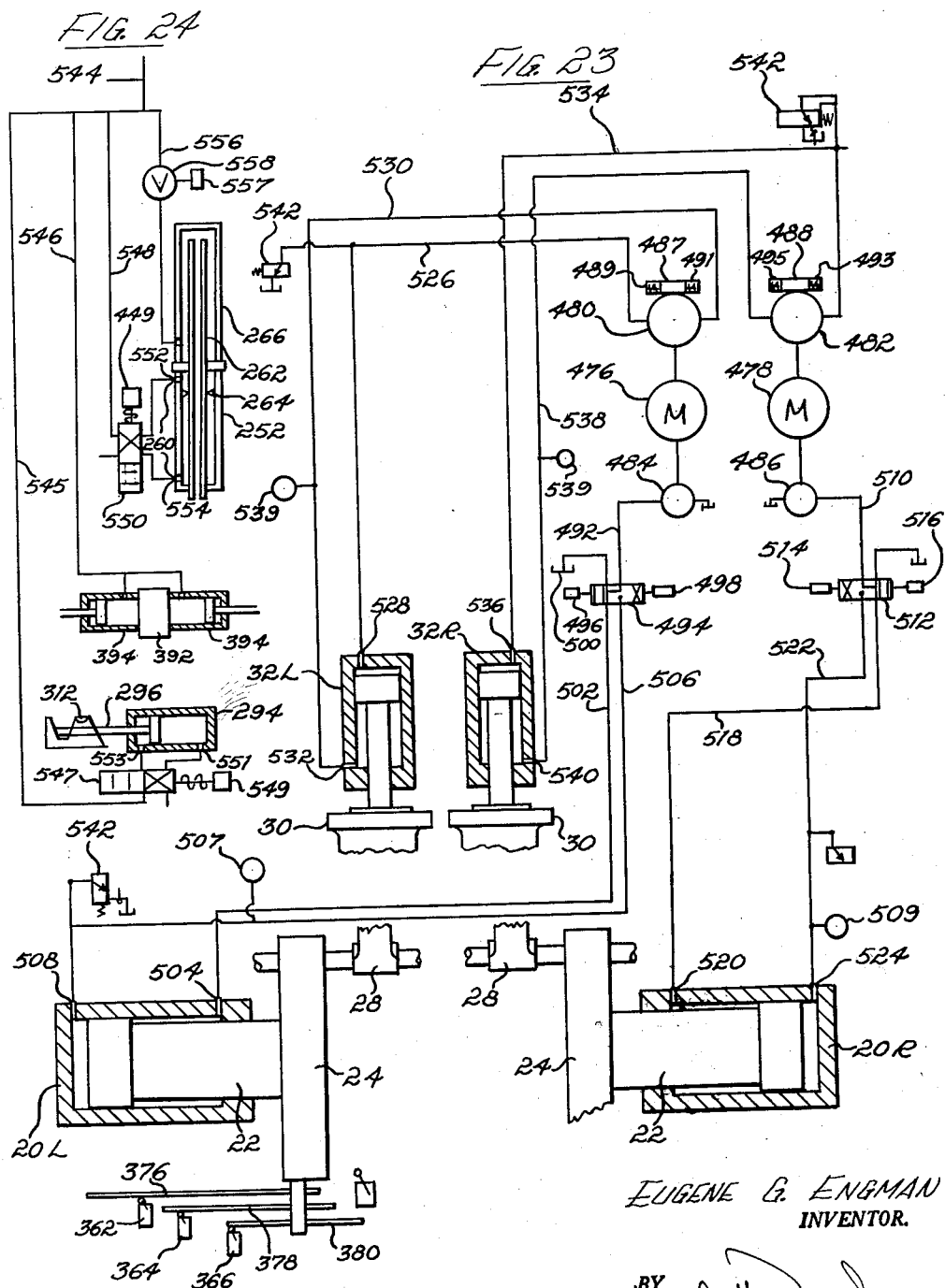

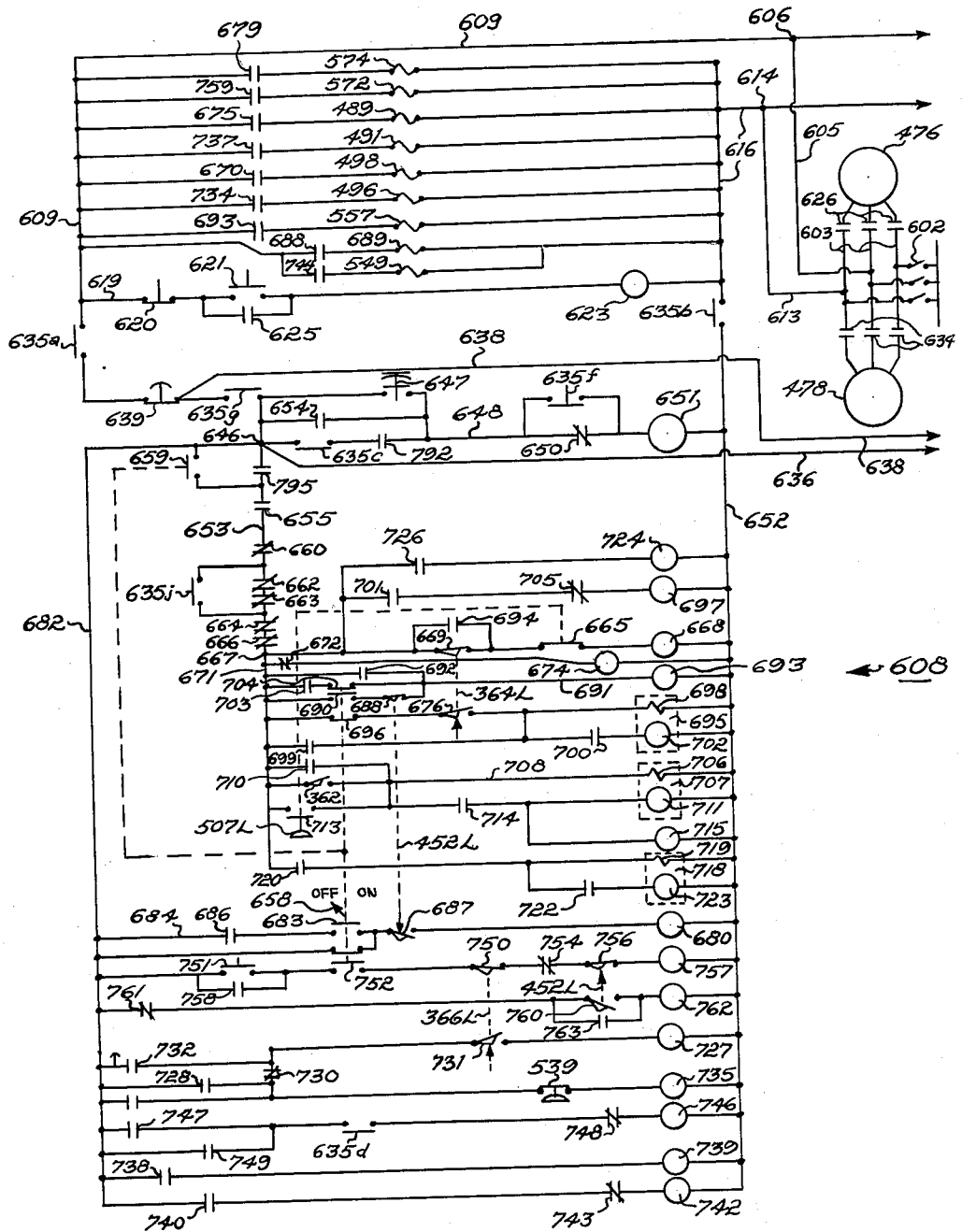

United States Patent Office 3,110,928
Patented Nov. 19, 1963

3,110,928
APPARATUS FOR MAKING LARGE HOLLOW ARTICLES
Eugene G. Engman, Point O'Palms, Nokomis, Fla.
Filed Aug. 11, 1960, Ser. No. 49,099
12 Claims. (Cl. 18—5)

My invention relates to apparatus for making large hollow plastic articles.

As is well known, blow molding is a process for the manufacture of hollow articles wherein a hollow piece of plastic material or parison is held in an exterior mold and air is blown into the hollow of the material to expand it against the mold. The general practice has been known for many years in the bottle making industry but has only recently been applied to the fabrication of plastic articles.

The machine of my invention has several novel features which, to my knowledge, make possible for the first time the blow-molding of really large hollow articles. The machine consists of two identical halves each of which possesses extrusion mechanism and a mold whereby the plastic articles are formed alternately by each of the halves. In pursuit of this alternate operation I provide novel mechanism for accumulating alternately measured quantities of plasticized polymer for alternate ejection into each of the machine halves. Since the machine of my invention was designed for the purpose of manufacturing large articles such as 55 gallon containers it is evident that a relatively large amount of plastic must go into each container. Extruders which soften or melt plastic and deliver it to a molding machine have a necessarily limited output in that the heat transfer properties of plastic materials are relatively poor and high temperatures cannot be used lest decomposition of the plastic take place. Since my process involves the formation of a free-hanging tubular parison in substantially fluid condition, delivery of the plastic must be complete within seconds. To meet this difficulty I have provided novel mechanism for the alternate accumulation of plasticized polymer from the extruder, one associated with each side of the machine, so that the output of the extruder may be accumulated to the quantity necessary for one of my containers and ejected with great rapidity at the desired stage in the cycle in the operation of the machine so that the fluid parison so formed can be treated as virtually a solid parison, for an instant holding its shape, sufficient to close the mold about the parison and begin its expansion into the mold.

Another novel characteristic of my invention resides in the timing of the relation between the formation of the parison and the closing of the molds thereon, whereby the containers are blown within a very short interval after parison formation.

Another feature of note in the machine of my invention resides in the means by which my molds are closed. The parison as ejected from die head of the machine is an open ended tube. The mold is formed in two symmetrical halves. The bottom edges of the mold halves are employed to pinch closed the parison at the bottom end thereof and to neck down the parison at the top end to fit closely around an air injection nozzle. Under common practice one die half is stationary and the other die half is movable toward and away from it. Since the parison must be extruded between the two die halves the unilateral movement of the movable die half toward the stationary die half will result in an unsymmetrical closure of the parison at the bottom end and pinch off at the top end with consequent unsymmetrical thinness of the parison wall in those areas. In small articles employing a parison of small diameter, the problem may be inconsequential but in molding large articles such as I have in mind, I find a parison having a diameter on the order of four inches to be necessary and in so large a parison the problem is serious. To meet this difficulty I have devised this novel mechanism whereby a symmetrical closing of the mold halves on the parison is achieved even though only one of the mold halves is powered for movement.

Other objects and advantages and features of novelty of my invention will be apparent from the following description and drawings of which:

FIG. 1 is a front elevation of a machine embodying my invention;

FIG. 2 is a top plan view thereof;

FIG. 3 is an elevation thereof taken from the right side of FIG. 1;

FIG. 4 is a vertical section through the right hand accumulator and die head of the machine taken substantially along the line 4—4 of FIG. 2 looking in the direction of the arrows;

FIG. 5 is a section taken substantially along the line 5—5 of FIG. 4 looking in the direction of the arrows;

FIG. 7 is a side elevation of the outside of the right hand carriage of the machine;

FIG. 8 is a section taken along the line 8—8 of FIG. 7 looking in the direction of the arrows and showing other associated parts;

FIG. 9 is an end elevation of the cutter assembly taken substantially from the line 9—9 of FIG. 7;

FIG. 10 is a side elevation of the blowpipe assembly;

FIG. 11 is an enlarged elevation, partly in section, of the blowpipe cylinder and associated parts;

FIG. 12 is a top plan view of the blowpipe assembly table taken substantially from the line 12—12 of FIG. 10;

FIG. 13 is a transverse vertical central section through my machine shown somewhat diagrammatically with some parts removed showing two sets of representative dies as mounted in the machine in a stage in the working cycle of the machine;

FIG. 14 is a top plan view of one set of the dies of FIG. 13;

FIG. 15 is a section through the surface of a die showing a trapped air escape poppet valve;

FIG. 16 is a section taken substantially along line 16—16 of FIG. 2 looking in the direction of the arrows and showing the limit switches and control rods thereof in elevation;

FIG. 17 is a bottom plan view of one side of my machine showing the parison follower supporting structure;

FIG. 18 is an end elevation of the parison follower assembly;

FIG. 19 is a side elevation thereof;

FIG. 20 is a top plan view of the parison follower table;

FIG. 21 is a top plan view of the parison follower assembly taken substantially from the line 21—21 of FIG. 19 looking in the direction of the arrows;

FIG. 22 is a side elevation of the bottom end of the mechanism as illustrated in FIG. 21;

FIG. 23 is a diagrammatical representation of the hydraulic circuit and mechanism for operating my machine;

FIG. 24 is a diagrammatic representation of the pneumatic system thereof;

Figure 6:
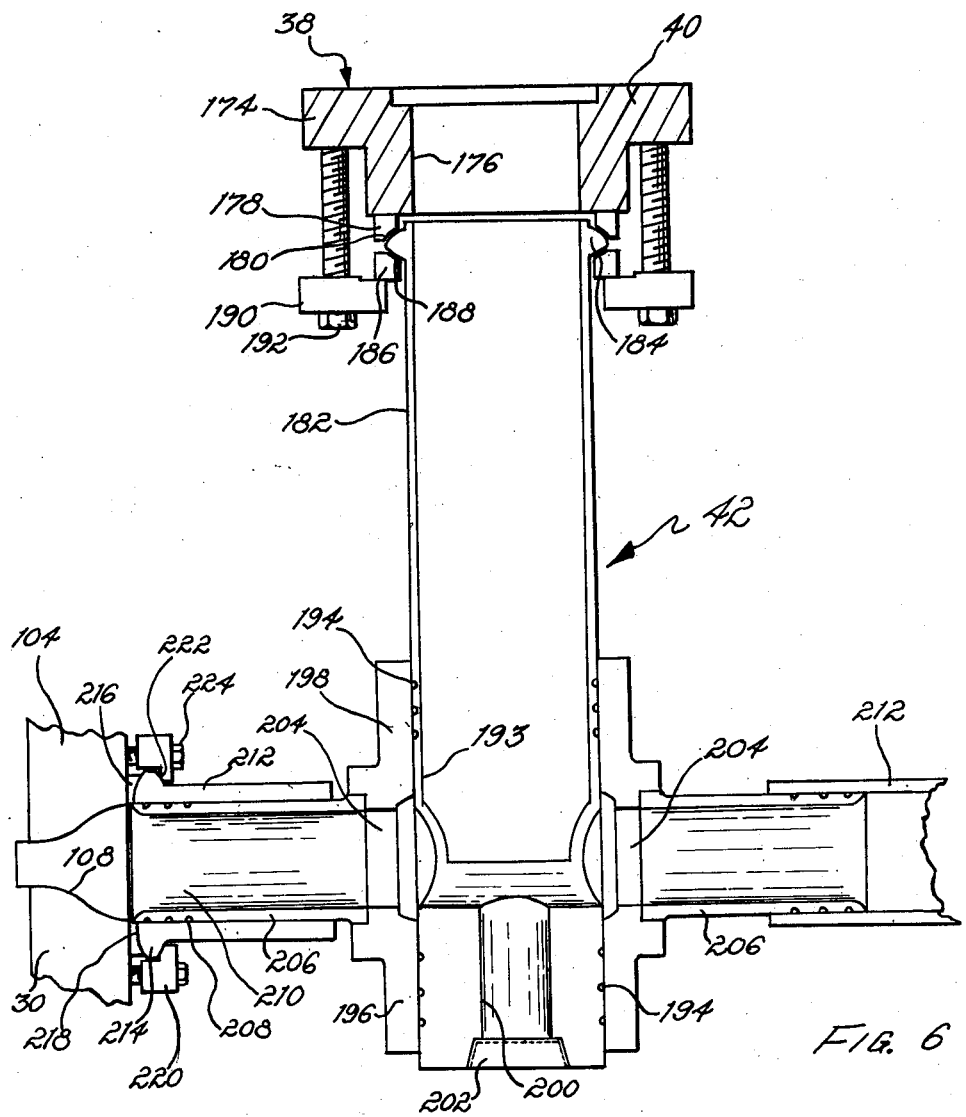
FIG. 6 is a transverse section through the T-joint connecting the extruder to the accumulators.

Referring particularly to FIGS. 1, 2 and 3, the illustrated embodiment of my machine consists of a rectangular base composed of I-beams 10 appropriately welded together and adapted to rest on a floor or over a pit. A pair of substantially square end plates 12 are mounted vertically at the ends of the base and a similar stationary center plate 14 spans the base at its center. Bottom and top columns 16, 18 extend from the corners of each of the end plates to corners of the center plates 14. The columns are appropriately threaded and shouldered to secure the three plates together in rigid fashion and to provide guides for the movement of other members of my machine.

The end plates mount double acting hydraulic cylinders 20 on their outside surfaces. The rams 22 thereof extend through the end plates 12 and are connected to clamps 24. The clamps are square plates mounted on columns 16 and 18 by bearing-equipped bores 26 in the corners thereof. The rams 22 are fixed to the clamps 24 as by threading or the like so as to move the clamps toward and away from the center plate 14 on the columns. The top columns 18 likewise mount a pair of carriages 28, one on each side of the center plate 14. The carriages have mounted thereto accumulators 30 with hydraulic operating mechanism 32 and die heads 34 carried by the accumulators. Blowpipe assemblies 36 are also carried by the carriages to be centered over the die heads 34. My machine also incorporates an extruder 38 as a source of plasticized polymer such as polyethylene or the like. The extruder is a commercial article of manufacture having heated walls and incorporating an auger to move the plastic to the outlet 40 thereof. The outlet of the extruder is connected to the accumulators by means of a T-pipe assembly 42. The extruder may be mounted on a table 44 so as to position it properly with respect to the molding machine.

Considering particularly FIGS. 7 and 8 in which the right hand carriage 28 is illustrated, the carriage consists of an L-shaped vertical web 46 bounded by plates secured at right angles thereto. A front face plate 48 is secured diagonally across the front edge of the web 46 so as to project outwardly of the web at its lower end as at 50 and inwardly of the web at its upper end as at 52. On the inside of the downward projection 56 of the L a plate 54 is secured which extends outwardly from the web 46 a distance equal to the lower end 50 of plate 48. The lower end of the projection 56 is cut out on an arc and a sleeve bearing 58 is welded longitudinally to the bottom edges of the plates 48 and 54. A plate 60 is welded to the under side of the web 46. Plate 60 is shaped to provide outwardly extending gussets 62 at each end of the web 46 and a trapezoidal cutter mount 64 extending inwardly of the web 46. Rectangular plates 66 are welded on their bottom edges and side edges to the cutter mount 64 and the inside face of the web 46 for stiffening. The rear end of the web has a plate 68 welded thereagainst substantially even with the web on the inside surface and extending substantially outward therefrom.

Plate 68 therein has welded thereto a substantially triangular vertical plate 70 extending oppositely from web 46 and in a plane parallel to web 46 but substantially outward therefrom. Plate 70 has a horizontal top edge 72 and an upwardly and rearwardly sloping bottom edge 74. A plate 76 is secured to edge 74. The bottom corner of plate 70 is cut out on an arc and a relatively long sleeve bearing 78 is secured to the bottom edges of plate 68 and 76 as by welding. Bearings 58 and 78 are mounted on columns 18.

Above the bearing 78, plate 70 has a long internally threaded sleeve 80 projecting outwardly therefrom and a boss 82 on the inside surface in alignment with sleeve 80. Rearwardly of the sleeve 80 three holes 84 are bored through plate 70. The rear end of plate 70, which would be the acute angle of the triangle, is truncated and has a rear end plate 86 welded thereagainst. A central support plate 88 is welded along its bottom edge and side edge to plate 74 and plate 70 respectively between the holes 84 and the end plate 86 for additional strength.

A top plate 90 is secured across the whole of the carriage. The top plate is relatively narrow toward the front of the machine and lies largely to the inside of web 46. In that area thereof over plate 70 the top plate is extended outwardly to provide a table 92 for the accumulator. The rear inside corner of the table 92 may be beveled as at 94 in order that the extruder 38 may be properly placed close to the machine.

Referring additionally to FIGS. 4 and 5, a pair of square blocks 96 and 98 are secured in spaced relation on the tops of the carriage tables 92 by bolts 100 extending up through the table. The blocks are tied together by shouldered bolts 102. The rearmost block 98 mounts the two-way accumulator hydraulic cylinder 32 on its rear side. Block 96 mounts the accumulator shell 104 on its front side. The shell is a heavy walled cylindrical member open at its rear end and bored on its rear edge for the reception of bolts 106 by which the shell is secured to the block 96. The shell has a longitudinally narrow inlet port 108 formed in the wall thereof about at the longitudinal center thereof. The shell contains a relatively long piston or plunger 110, the plunger being about half as long as the interior cavity of the shell itself. An adapter 112 is secured to the rear surface of the piston 110 by bolts 114. The adapter has a threaded bore 118 in the center thereof which is threaded on to the rod 120 of the operating cylinder 32. An outlet port 122 is provided in the closed forward end 124 of the accumulator shell.

The die head includes an outer shell 126 which is essentially an elbow with a horizontal portion 128 and a downwardly directed portion 130. The horizontal portion has a flange 132 at the free or rearward end thereof through which bolts 134 are passed to secure the die head to the front face of the accumulator shell. The horizontal portion, of course, has a bore 136 therethrough in registry with the outlet 122 of the accumulator. The vertical portion 130 of the die head shell is likewise hollow, the central bore thereof communicating with the bore 136 in the horizontal portion. The lowest part of the vertical portion has a relatively large internal diameter, this portion constituting a female die receptacle 138. The receptacle portion terminates at its upper end in a shoulder 140, and upwardly of the shoulder the internal diameter is somewhat less, constituting the upper part 142 of the parison forming passage 144. Upwardly of the top wall of the horizontal bore 136 the internal diameter is still further reduced as at 146 to constitute a male die seat and upwardly of the seat a blowpipe bore 148 communicates with the exterior.

The male die 150 is a tubular member having a central blowpipe bore 152 therethrough equal in diameter to the blowpipe bore 148. At its upper end 154 the male die has a smaller exterior diameter proportioned to be contained snugly in the male die seat 146 of the outer shell 126. About half way down the male die swells conically outward as at 156 and terminates at its lower end in a larger cylindrical portion 158. Bolts 160 extend through the top surface of the outer shell 130 closely around the blowpipe bore 148 and into the upper end of the male die to secure it in the seat 146. About half way down the vertical portion of the outer shell, set screws 162 having pins 164 extend through appropriately tapped holes in the outer shell and bear against the side walls of the male die to support it within the outer shell. There may be four of the set screws 162. The female die 166 is essentially a length of tube having an outside diameter appreciably less than the inside diameter of the female die receptacle 138. A retainer ring 168 is secured against the bottom end of the vertical portion of the outer shell as by screws 170 and overlaps the lower end of the female die to hold it in place. The female die 166 should be slightly longer than the female die seat 138 so that the retainer ring 168 can pinch it against shoulder 140.

Set screws 172 extend through appropriate threaded bores in the outer shell 126 and into the female die receptacle 138 to bear against the female die and center it with relation to the male die 150.

FIG. 6 illustrates in detail the T-pipe assembly by which the extruder is connected to the accumulators. The front end 174 of the extruder 38 has an outlet port 176 therethrough through which the plasticized polymer is delivered to the molding machine. A ring 178 surrounds the outlet port 176 and is spaced radially outwardly from it. The ring has a substantially spherical concave front face 180. A pipe 182 having an internal diameter equal to the extruder outlet 176 has a bead 184 formed thereabout adjacent its inlet end. The sides of the bead are complementary to the curvature in the face 180 of the ring 178. A second retainer ring 186 having a concave bead-engaging edge 188 and fitting the pipe 182 loosely is mounted on the pipe to the front of the bead 184. Lock ring 190 clamps the bead 184 of the pipe between the two concave surfaces of the ring 178 and the ring 186 to secure the pipe in fluid-tight relation against the outer end of the extruder. Ring 190 overlaps the outer edge of ring 186 but fits the pipe 182 even more loosely than ring 186. Bolts 192 extend through appropriate bores in the ring 190 and into threaded holes in the extruder end 174 to effect the clamping described.

The other end 193 of the pipe has circumferential grooves 194 formed about the outside surface thereof. The end 193 is telescopically contained in a fitting 196. The fitting includes a sleeve 198 which contains the end 193 of pipe 182 and a concentric bore 200 of less diameter extending forwardly beyond sleeve 198 which may be plugged as by a plug 202 or be equipped with a pressure relief valve or a pressure gauge. The fitting likewise has a cross bore 204 therein which intersects sleeve 198. Pipe extensions 206 are welded to the fitting to extend the cross bore 204. The extensions 206 also have circumferential grooves 208 in the exterior thereof at their free ends 210.

Telescoping sleeves 212 fit over the pipes 206 and have at their remote ends a bead 214 convexly curved on both surfaces.

The wall of the accumulator shell 104 has the aforementioned inlet port 108 therein. On the exterior of the shell about the inlet port a ring 216 is formed having a concave surface 218 against which the outer surface of bead 214 seats. The bead is clamped against the ring 216 by a lock ring 220 having an inclined or concave bead engaging surface 222 to engage the opposite or inner side of the bead.

Bolts 224 extend through the lock ring into the accumulator shell 104 to clamp the ring against the bead 214 to secure it in fluid-tight relation to the accumulator shell wall.

The purpose of this T-pipe assembly is to accommodate small errors in the placement of the extruder relative to the molding machine and metal expansion caused by the flow of hot plastic therethrough. The machine and extruder are both very heavy and difficult to place exactly with respect to each other. The joint described at the extruder outlet permits a slight misalignment both in placement and in angle between the two members and the joints connected to the accumulator shells permit an error in angle. The telescoping connection of the pipe end 193 in the sleeve 198 compensates for thermal expansion of pipe 182. The joints at the accumulator shells also permit a bowing of the cross member consisting of the sleeves 212 and the fitting due to pressure of the extruded plastic on the fitting. The grooves 194 and 208 receive, at first, a seepage of plastic which subsequently acts as a seal.

The blowpipe assembly 36 is particularly illustrated in FIGS. 10, 11 and 12. This assembly consists of a support 226 which has a base 228 bolted to the top 90 of the carriage 28 at a point midway between the bearings 58 and 78 so as to be centered on the longitudinal axis of the machine. The support consists of a long, slightly inclined tapering plate 230 having supporting ribs 232 welded to the sides thereof which terminates at its upper end in a vertical block 234 welded to the outside edge thereof. An L-shaped member consisting of a horizontal table component 236 and a vertical guide member 238 at its rear edge is mounted to block 234. The table and guide member have a vertical groove 240 in the rear edge thereof which embraces the block 234. A threaded bore 242 extends down through the table and guide member. Gibs 244 are bolted to the inside or back of the table and guide member to enclose partially the block 234 and constitute that block a vertical rail for up-and-down adjustment of the table 236. An ear 246 secured to the top of block 234 to extend over bore 242 and an adjustment bolt 248 extends through the ear and into bore 242 for such adjustment. The table has skirts 250 on the sides thereof.

A two-way pneumatic cylinder 252 is mounted vertically on the outer end of the table 236. The cylinder terminates at its lower end in a base plate 254, and screws 256 extend through the base plate and into the table 236 to mount the cylinder. The table has a bore 258 therethrough centered under the cylinder. The cylinder has air inlets 260 at the top and bottom ends thereof. The rod of the cylinder is a pipe 262 and extends beyond and out of the cylinder at both ends thereof. The pipe has a double gasket structure 264 thereon for the two-way movement thereof.

A cap 266 is mounted on top of the upper end 268 of the cylinder by screws 270. The cap is long enough to clear the upper end of the pipe 262 at its uppermost reach. The attachment of the cap to the cylinder is air tight and the cap has a blow air inlet 272 therein. The pipe is open at both ends. The bottom end 274 thereof has an internally threaded recess 276 into which a downwardly converging nozzle 278 is screwed. The bore of the nozzle is cylindrical and continuous with the bore of the pipe 262.

From the description so far, it will be appreciated that plastic is extruded from the extruder into the accumulators and from the accumulators downward out of the die heads 34 as a tubular parison. The mechanism which severs the parison from the die head is illustrated in FIGS. 7, 8 and 9. A rectangular block 280 is bolted to the under side of the cutter mount 64 of the carriage by bolts 282. The block 280 has an L-shaped groove 284 formed in the lower outside longitudinal edge thereof which contains the complementary L-shaped rail portion 286 of a cutter blade carrier 288. The cutter blade carrier 288 is an elongated member having the rail 286 on one edge thereof from which the remainder of the member extends laterally outward. A gib 290 is secured against the bottom of the block as by screws 292 so as to confine the rail within the groove for longitudinal movement therein. A double acting cylinder 294 having a rod 296 is secured to the outside face of the block 280 by bolts extending through ears 298 at the ends of the cylinder. At the end of the blade carrier remote from the cylinder 294, a tongue 300 is brought first outward and then upward to an end which is longitudinally aligned with the rod 296 of the cylinder 294 to constitute a connector for securing the carrier to the cylinder rod. The tongue has a bore therethrough, and a bolt 302 extends through the bore and is threaded into the end of the rod 296. Inwardly toward the cylinder a second tongue extends first laterally outward from the rail 286 below the cylinder 294 as at 304 then upwardly outside the cylinder as at 306 and then again laterally outward as at 308. The portion 308 has a broad groove 310 thereacross within which one end of a blade 312 is secured as by screws 314. The plane of the movement of the blade is such that the blade travels immediately next to the bottom face of the extruder head as may be best seen in FIG. 7. In order to admit air into the cylinder 294, intersecting bores 316 may be made through the block and the cutter mount 64 in communication with the air ports (not shown) of the cylinder.

In FIGS. 13 and 14 I have shown a representative set of dies 320 to be used in conjunction with my machine. The illustrated dies are for the purpose of making such containers as 55 gallon drums. The dies consist of a longitudinally split drum form having semi-cylindrical wall surfaces and semicircular top and bottom ends 324 and 326. The dies are supported by rectangular horizontal fins 328 which may be cut out as at 330 to define feet 332. The ends 334 of the feet are desirably bent over to lie flat against the clamps 24 and the center plate 14 and are bored for the reception of bolts 336. The center plate and clamps have threaded holes scattered over the facing surfaces thereof to receive the bolts 336 and afford a wide variety of die positions. The fins 328, of course, have semicircular cutouts in their edges opposite to the feet 332 to receive the outside surfaces of the die halves proper.

The top and bottom semicircular ends of the dies have beveled portions 338 in the central part of their meeting edges by which the parison is closed and pinched off. The beveled areas need be no longer than the flattened width of the parison. The beveled area of the top ends of the dies also has semicircular notches 340 therein which, when the dies are closed, define a round hole into which the air nozzle fits to blow the parison out against the mold surface.

I have on occasion experienced some difficulty in exhausting the air trapped between the parison and the inside of the mold halves. To meet this difficulty I have provided poppet valves 342 which are particularly illustrated in FIG. 15. A central hole 344 is bored through the wall of the die to contain the stem 346 of the poppet valve 342. Other holes 348 are also bored close to the valve stem hole. The valve 342 has a flat valve face 350 proportioned to cover and close the holes 348. A valve seat 352 is formed on the inside of the mold surface which exactly receives the valve face 350. The stem of the valve projects beyond the outside surface of the mold when the valve is seated and a spring such as a leaf spring 354 is secured to the outside surface of the mold to bear against the projecting valve stem 346 and urge the valve to an open position. The poppet valves not only exhaust trapped air but serve as an indicator that the parison is being properly blown.

Two more details should be discussed in conjunction with the mechanical features of the machine. Considering particularly FIG. 16 an L-shaped bracket 356 is secured to the top edge of the end plates 12 at the rear corner thereof which provide a base 358 and a vertical wall 360 inwardly of the base. Three control switches, blow switch 362, clamp dwell switch 364 and clamp stop open switch 366, are secured to the base 358. The wall 360 has three holes 368 bored therethrough. At the front side of the bracket 356 a tubular bumper 370 is mounted.

The clamp likewise has an L-shaped bracket 372 secured to its top edge adjacent the back corner which provides a vertical wall 374. The wall 374 has three holes therein in alignment with the holes in wall 360. Switch control rods 376, 378 and 380 are adjustably secured in the holes in wall 374 by set screws 382. The switches 362, 364, 366 have actuating arms 384 which normally lie in the path of the aligned holes in the walls 360 and 374 and which are actuated by the ends of the rods 376, 378 and 380 moving outwardly through the holes 368 in wall 360 and forcing the switch arms 384 to a position away from the vertical.

An operating cycle starts from the illustrated position with all the rods bearing on and actuating the switches. As the clamp moves inward in its cycle, rod 380 immediately runs off the stop open switch 366. Further in its movement, rod 378 is drawn off the arm of clamp dwell switch 364, and the clamp waits at this point in its movement for a timed interval. The clamp then resumes closing until rod 376 runs off blow switch 362, when the clamp stops again at its inmost point of travel. Thereafter, the clamp moves out until rod 380 actuates clamp stop open switch 366.

The wall 374 also has a bore 386 therethrough toward the front of the three switch control rod holes.

A push rod 388, which is threaded over nearly half its length, is threaded into the sleeve 80 of the carriage and projects through the bore 386 of the clamp bracket wall 374. The unthreaded outer end of the rod 388 is aligned with the bumper 370. A nut 390 is mounted on the threaded portion of the rod 388 inwardly of the wall 374. The nut 390 is big enough so as not to pass through the bore 386.

The center plate has a block 392 secured to the top edge thereof at the back corner, and a pair of one-way pneumatic cylinders 394 are secured at their bases to the block with the rods 396 thereof extending outwardly. The ends of the rods are in alignment with bosses 82 on the inside surface of the carriages.

In the illustrated machine I also show a parison follower assembly which need not necessarily be incorporated in the machine but which can be employed to control the parison and to actuate certain elements in the operating cycle of the machine. In FIG. 17 is shown the one side of the I-beam base 10 of the machine viewed from the underside. For orientation the center plate 14 likewise is shown. Two vertical plates 400 are welded at their ends to the underside 402 of the top flanges of the longitudinal I-beams to span the space between them. The plates dip downwardly from their ends and have a horizontal central section 404. Two other vertical plates 406 are welded at their ends between the ends of the horizontal sections 404 of the plates 400. Narrow plates 408 (FIG. 22) are bolted to the top edges of the longitudinal plates 406 provide inwardly directed edges or rails 410 along which the parison follower assembly may be adjustably moved.

The parison follower assembly includes a flat base plate 412. At its inner end 414 or that end nearer the center plate 14 the plate is wider than the distance between the rails 410 and is grooved out on its upper edge as at 416 to be received within the rails 410. Gibs 418 overlie the grooves 416 and contain the rails 410 within the grooves. The rail thickness should be slightly greater than the grooves so that tightening the gibs thereon will lock the base 412 against longitudinal movement. The gibs are secured to the base plate by bolts 420. Outwardly of the grooved portion of the plate the plate edges are reduced in width to lie inside the rails 410 as at 422.

The inner part of the base plate mounts a two-way hydraulic cylinder 423. The plate has a large bore 424 therethrough and the cylinder is inserted into the bore to hang downward therefrom, the cylinder having a rod end cap 426 which is secured to the top face of the base by bolts 428. The rod 430 thereof thus moves upward from the base plate and downward toward it.

The rod supports a circular table 432 at its upper end. The table has a diameter somewhat greater than that of the extruded parison. The table is secured to the top of the rod 430 by a fitting 434 which extends nearly to the periphery of the table as at 436 on one side thereof. The fitting 434 has the upper end of a T-shaped cam rail 438 secured against the surface 436 as by screws 440. The cam rail has about the same external length as the rod 430 but is situated outside the cylinder 422. The cam rail is guided at its lower end by a plate 442 secured to the top face of the base 412 by screws 444. The cam rail is oriented with the stem 446 thereof facing outwardly from rod 430. The guide plate 442 has a rectangular notch 448 formed therein embracing closely the back and sides of the cam rail 438 by which the rail is guided. Since the pressures on the cam rail are exerted either inwardly or laterally, front or outer support is not necessary. The base plate has a large square aperture 450 therein to permit the movement of the cam rail 438 up and down therethrough.

In the outer unsupported end 422 of the base 412 a follower stop up limit switch 452 is secured having a switch arm 454 extending over the aperture 450 on one side of the cam rail 438. A follower stop down limit switch 456 is likewise secured to the base having a switch arm 458 extending over the aperture 450 on the other side of the cam rail 438. A variable flow control valve 460 is secured to the base plate opposite the stem 446 of the cam rail 438 with a cam follower 462 extending over the aperture 450. The flow control valve is of a type in which full flow occurs through the valve when the cam follower is in its illustrated unactuated position and a progressive restriction is introduced into the flow as the cam follower is moved into the valve body.

I contemplate that three sorts of cams will be mounted to the cam rail. Referring particularly to FIGS. 19 and 20, a block 464 will be secured to the cam rail toward its top which is offset to the left of the central axis of the rail. A similar cam 466 will be secured to the rail toward its bottom which, however, is offset to the right. The offset of cam 464 is sufficient to engage switch arm 454 of switch 452 to actuate that switch and cam 466 is offset sufficiently to the right to engage and actuate switch arm 458 of switch 46. The other cams 468 have no offset and can pass freely between switches 454 and 458 without actuating them, but extend outwardly sufficiently to engage and actuate the cam follower 462 of valve 460. These cams in the illustrated embodiment are rectangular blocks having outer beveled corners 470. The bevels of cams 468 will first engage cam follower 462 as the cam rail moves downwardly and cause a progressively diminishing flow of fluid through valve 460 until the follower is against the outer end 472 of the cams. There will then be a period of steady reduced flow through the valve until the cam arrives at the opposite beveled edge after which there will be an increasing flow until the cam is withdrawn altogether from the follower and full flow occurs. The cams 464, 466 and 468 are mounted to the stem 446 of the cam rail 438 by slots 473 formed in the back side of the cams and a set screw 474 extending through the side of the cams to clamp against the side of the rail stem 446.

The hydraulic system is illustrated diagrammatically in FIG. 23. Motors 476 and 478 are provided to power the left side of the machine and the right side respectively. The motors 476 and 478 drive respectively pumps 480 and 482 which operate the accumulator cylinders 32L and 32R and pumps 484 and 486 which operate respectively the clamp cylinders 20L and 20R. The output of pumps 480 and 482 goes through flow-reversing valves 487 and 488 having a no-flow center position. Solenoid 489 directs the flow of fluid from pump 480 through duct 526 to the head end of the left accumulator cylinder 32L and solenoid 491 directs the output to the rod end thereof. Solenoid 493 directs the flow of fluid from pump 488 to the head end of the right hand accumulator cylinder 32R and solenoid 495 directs the flow to the rod end thereof. Pumps 484 and 486 are continuous output pumps. Pump 484 leads through duct 492 to a four-way valve 494 operated by solenoids 496 and 498. Valve 494 has a no-flow central position in which the pump output is delivered back to reservoir 500. From the four-way valve 494 duct 502 is connected to the rod end 504 of the left clamp cylinder and duct 506 is connected to the head end 508 thereof. Pump 486 is likewise connected by a duct 510 to a four-way valve 512 having a no-flow central position and actuated by solenoids 514 and 516. The four-way valve is connected by duct 518 to the rod end 520 of the right clamp cylinder and through duct 522 to the head end 524 thereof. Pump 480 is connected by duct 526 to the head end 528 of the left accumulator cylinder and by duct 530 to the rod end 532 thereof. Pump 482 is connected by duct 534 to the head end 536 of the right accumulator cylinder and by duct 538 to the rod end 540 of the right accumulator cylinder. Ducts 530 and 538 have pressure actuated switches 539 and ducts 506 and 522 have pressure actuated switches 507 therein. The hydraulic circuit is provided with appropriately placed pressure relief valves 542 and pressure gauges (not illustrated) will likewise be connected at critical points throughout.

FIG. 24 represents the pneumatic system in diagrammatic fashion. The plant air line 544 delivers air under pressure through duct 546 to the head ends of the carriage return cylinders 394. These cylinders are constantly under pressure. Air under pressure is likewise delivered through a duct 548 to a solenoid 449 operated four-way valve 550 to the head 552 and rod 554 ends of the blowpipe control cylinder 252. Normally the rod end of cylinder 252 is under pressure but upon energization of solenoid 449, pressure is delivered to the head end. Air under pressure is also delivered through duct 556 having solenoid 557 operated valve 558 therein to the cap 266 of the blowpipe assembly.

The pneumatic system is likewise connected through duct 545 to a four-way valve 547 operated by a solenoid 549 to operate the cutter cylinder 294. Normally pressure is delivered to the head end 551 of the cylinder but upon energization of the solenoid 549 air is delivered to the rod end 553 of the cylinder.

Figure 25:
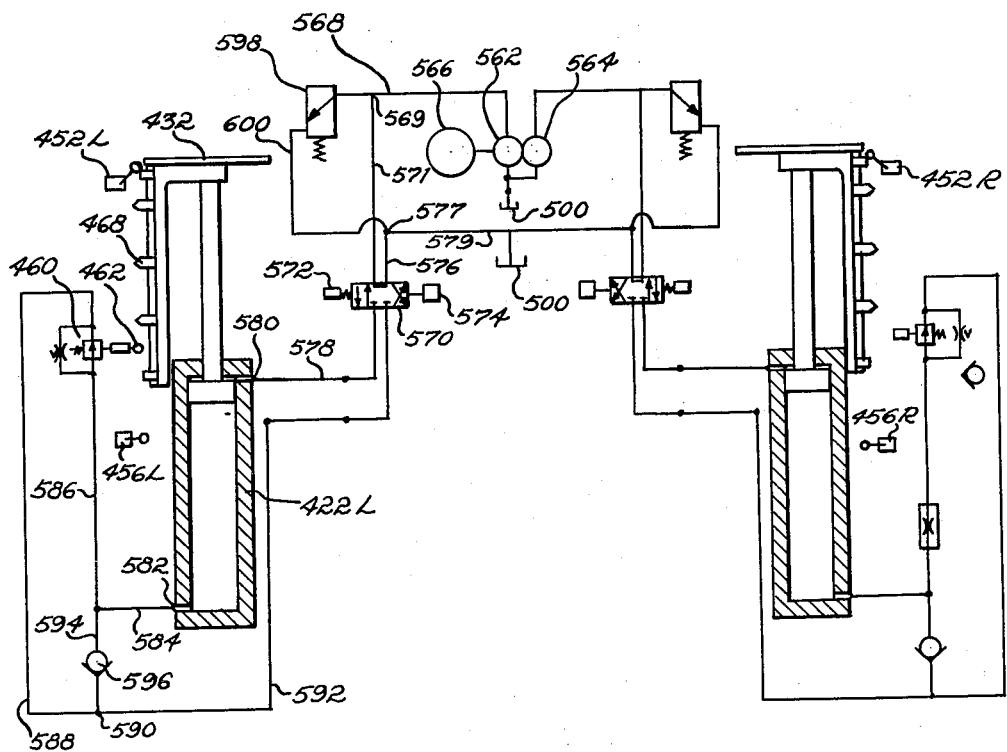
FIG. 25 is a diagrammatic representation of the parison follower hydraulic system.

The hydraulic system of the parison control is illustrated in FIG. 25. Pumps 562 and 564 power the left and right parison followers respectively, drawing fluid from reservoir 500. Both pumps are powered by motor 566. Since the two sides of the circuit are identical only the left side will be described. Pump 562 delivers fluid through duct 568 to a point 569 and from point 569 through duct 571 to a four-way three-position valve 570 operated by solenoids 572 and 574 and having a central reservoir return position through duct 576, point 577 and duct 579 when both solenoids are de-energized. The valve is connected through duct 578 to the rod end 580 of the parison follower cylinder 422. The head end 582 of the cylinder is connected through ducts 584 and 586 to the variable flow control valve 460. Duct 588 is connected to the other side of valve 460 and to point 590. Duct 592 returns from point 590 to the four-way valve 570. Point 569 is connected to a pressure relief valve 598 which leaks through duct 600 to point 577 and thence through duct 579 to reservoir 500. A duct 594 having a check valve 596 therein connects duct 584 to point 590.

When solenoid 574 is energized, fluid flows from the pump through ducts 568, 571 and 578 to the rod end 580 of the cylinder 422, carrying the parison follower table 432 downward. Fluid, of course, will have to be expelled from the head end of the cylinder in such movement through ducts 584 and 586, the variable flow control valve 460, ducts 588 and 592, four-way valve 570 and ducts 576 and 579 to reservoir. Fluid is prevented from by-passing the flow control valve 460 through duct 594 by check valve 596. As the cam follower 462 of the flow control valve is moved by the cams 468 to restrict the flow of fluid through valve 460, the forced slowing of the descent of the parison follower 432 exceeds the escape pressure setting of pressure relief valve 598 and a part of the output of the pump 562 will leak through the pressure relief valve, duct 600 and duct 579 to reservoir.

When solenoid 572 is energized, fluid is delivered through ducts 568 and 571, valve 571 and duct 592 to point 590. From point 590 fluid passes through check valve 596 and 584 to the head end of the cylinder to raise again the parison follower. Fluid is exhausted from the rod end of the cylinders through duct 578, the four-way valve 570, and to reservoir.

Figure 26B:
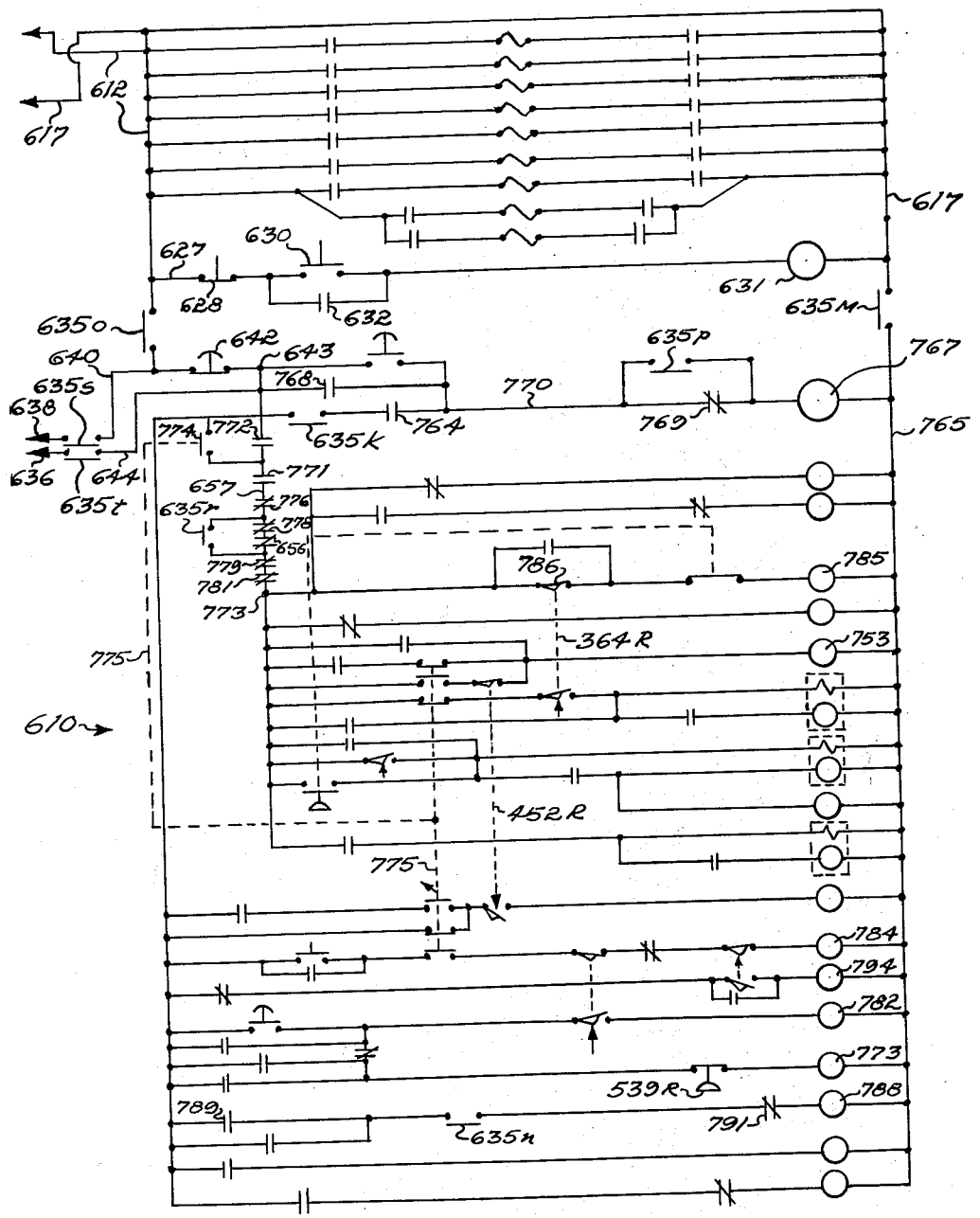
FIGS. 26A and B are an electrical circuit diagram for the machine.

It is believed that the electric circuit is best described in conjunction with the operation of the machine. Referring to FIGS. 26A and B, at the start of the operation of the machine, a main power switch 602 is closed which energizes the leads 603 to the pump motors 476 and 478. Lead 605 delivers current through terminal 606 to the left side control circuit 608 through lead 609 and to the right side control circuit 610 through lead 612. Lead 613, connected through terminal 614 to leads 616 and 617, is the ground connection for the two control circuits respectively. A wire 619 is connected across lead 609 and ground 616 and has therein a normally closed stop switch 620, a normally open left motor start switch 621 and the solenoid of a left motor start relay 623. The starter switch 621 has a left-motor-start-relay holding switch 625 in parallel therewith. Closing of switch 621 energizes the solenoid 623 of the left motor start relay to close holding switch 625 and close the normally open switches 626 leading from the main power supply 602 to motor 476. The right circuit 610 likewise has a line 627 having a normally closed right motor stop switch 628, a normally open right motor start switch 630 and the solenoid 631 of a right motor start relay therein connected across lines 612 and 617. Start switch 630 has a motor-start-relay-operated holding switch 632 in parallel therewith. Closing of the right motor start switch 630 energizes solenoid 631 of the right motor start relay which in turn closes the holding switch 632 and the normally open switches 634 to deliver current from the power source 602 to motor 478.

I provide a rotary selector switch of which only the component switch elements are shown which determines whether, upon energization of the machine, there will be a single cycle of the left side, a single cycle of the right side, a single, nonsequencing cycle of both sides, continuous operation of the left end, continuous operation of the right end, or continuous operation of both ends, sequencing. This switch in any of its several positions involves the open or closing of a number of contacts which I will identify as number 635 succeeded by a small letter. I will describe the circuit as it achieves continuous operation of both ends since this is the primary use intended. In this setting of the selector switch, switches 635a, 635b, 635c and 635d of the left circuit are closed and switches 635f, 635g and 635j are open. In the right side control circuits switches 635k, 635m and 635n are closed and switches 635o, 635p, 635r are open. In the connecting circuit composed of leads 636 and 638 which extend between the left and right side control circuits 608 and 610, switches 635s and 635t are closed. Current is delivered through lead 609, closed selector switches 635a and a normally closed stop switch 639 to connecting lead 638. Referring to the right sheet, the current continues through lead 638, closed selector switch 635s, lead 640 and a normally closed stop switch 642 to terminal 643. Current returns to the left control circuit from terminal 643 through lead 644, closed selector switch 635t, and lead 636 to terminal 646. Terminal 646 is connected through a normally open clamp close switch 647 to a conductor 648 which is connected through normally closed contacts 650 and a left first control relay 651 to lead 652. Lead 652 in turn is connected through closed selector switch 635b to ground 616.

At the start of a cycle both clamps are open and both parison followers are up. At the time the machine was last stopped, let it be assumed that the right side of the machine had just concluded a cycle of operation. The right accumulator is empty and the left accumulator full. Heaters connected with the extruder, the accumulators and die heads have been kept in operation so the whole body of plastic contained in the extruder and machine is properly plasticized. The extruder auger is started just before or simultaneously with the molding machine to urge the plastic through the T-joint assembly to the inlet ports of the accumulators. The left accumulator being full, the whole output of the extruder will go to the right accumulator. To initiate the cyclic operation of the machine, the clamp close switch 647 is pushed closed to energize left first control relay 651. The energization of relay 651 closes a normally open holding switch 654 in parallel with the clamp close switch 647 to maintain relay 651 in energized condition and normally open contacts 655 in conductor 653 and to open normally closed contacts 656 in conductor 657 (right sheet).

A parison follower control switch 658 is incorporated in the circuit to determine whether the follower will or will not be used. The switch is illustrated in Off position to let it be assumed that it has been turned to On, reversing the position of the component switches as illustrated.

Parison follower control switch 658 moved to On closes switch 659. Current flows from terminal 646 through closed switch 659, closed contacts 655 of control relay 651 and normally closed contacts 660, 662, 663, 664 and 666 to terminal 667. From terminal 667, current flows through normally open but now closed switch 669 of left clamp dwell limit switch 364L and normally closed switch 665 of the clamp stop close pressure switch 507L to energize the left clamp close relay 668. Energization of relay 668 closes normally open contact 670 to energize the solenoid 498 of valve 494 (FIG. 23) to direct flow from pump 484 into the head end of the left clamp cylinder 20L to begin moving the clamp toward closure.

Conductor 671 is energized from terminal 667, through normally closed contacts 672 to energize the left accumulator close relay 674. Energization of relay 674 closes normally open contact 675 which energizes the solenoid 489 of valve 487 to direct the flow of fluid into the head end of the left accumulator operating cylinder 32L to advance the accumulator piston and force the contained plastic out through the die head as a tubular parison.

At this stage in the cycle of operation, the initial movement of the clamp withdraws rod 380 from engagement with the clamp stop open limit switch 366 to permit it assuming normal condition. Also, the advance of the left accumulator piston shuts off the inlet port to the accumulator and therefore directs all extruder flow to the right accumulator. The piston is long enough to block the inlet port constantly until it is fully retracted.

The clamp continues to close until rod 378 associated with left clamp dwell limit switch 364L (FIGS. 2 and 23) runs off the limit switch arm and permits the limit switch to assume its normal condition with switch 669 open and 676 closed. The opening of switch 669 interrupts the circuit to clamp close relay 668 which energizes solenoid 498 of valve 494 and permits the valve to assume its center no-flow position. Further advance of the clamp is thus halted.

The purpose underlying this delay in the closing of the clamp comes about through the necessity of closing the mold on the parison as quickly as possible after its formation. The clamp, therefore, is moved toward the parison at the same moment that parison formation starts but is halted close to the parison until parison formation is concluded. Having that much less far to travel, the clamp is in a position to close very quickly on the parison at the proper moment. The reason for the initial wider clamp opening, of course, is to permit an unloading of the dies or the removal of the formed plastic article therefrom. Adjustment of the clamp dwell limit switch rod 378 within the wall 374 will control the distance from the end plate 12 at which the hesitation or dwell of the clamp 24 will occur.

Simultaneously with the initiation of the movement of the clamp and the accumulator, the solenoid 574 of the valve 570 is energized to direct fluid from pump 562 into the rod end 580 of the parison follower cylinder 422 to draw the parison follower table downward. Solenoid 574 is energized by the closing of normally open contacts 679, which contacts are actuated by a follower down relay 680. The relay in turn is energized from terminal 646, conductor 682, lead 684, normally open contacts 686 and switch 683 of the parison follower control. Contacts 686 which are normally open are actuated by energized accumulator close relay 674 to closure. The switch 687 is associated with the follower down limit switch 452L which is that switch actuated at the bottom limit of parison follower movement by block 464. Switch 687 is normally closed but is illustrated as being open with the parison bottom limit switch 452L actuated.

The parison follower and accumulator cylinder continue to move until the block 464 encounters the parison down limit switch arm 454 at which time switch 452L is actuated. Actuation of the switch opens switch 687 de-energizing follower down relay 680, opening contacts 679 and de-energizing solenoid 574 to restore valve 570 to its no-flow position. At the same time normally open switch 688, also associated with limit switch 452L is closed. Switch 690 is associated with parison follower switch and is closed when the follower control switch is turned to On. Current thus is permitted to flow from terminal 667, switch 690, switch 688, and lead 691 to energize a second control relay 693. The energizing of control relay 693 closes contacts 692 to constitute a holding circuit for the relay. It likewise opens normally closed contacts 672 to de-energize accumulator close relay 674 which in turn permits contacts 675 to open which de-energizes solenoid 489 and permits valve 487 to assume its no-flow position (FIG. 23). Further extrusion of plastic from the accumulator is thus halted.

Energization of second control relay 693 signals also the end of the dwell period of the clamp. Solenoid 493 of valve 494 is again energized to direct fluid into the head end of the left clamp cylinder 20L by the closure of contacts 670 by relay 668. A pair of normally open contacts 694 operated by relay 693 are in parallel with switch 669 of follower down limit switch 364L. The energization of relay 693 closes contacts 694 which energizes clamp close relay 668 which closes contacts 675.

In the event that the parison be either missing from the machine or be not used, the signaling of the end of the dwell period of the clamp and the end of movement of the advance of the accumulator cylinder is signaled by a clamp dwell timer 695. The timer is energized from terminal 667 through switch 696 which is closed when the follower control switch is off and switch 676 which is closed by clamp dwell limit switch rod running off limit switch 364L to the timer solenoid 698. Energization of the timer solenoid closes contacts 699 and 700. The energization of timer motor switch 700 (open closed open) operates the timer motor 702. Switch 699 (open closed closed) is a holding switch for the timer circuit. Clamp dwell timer 695 is connected to actuate switch contacts 703 (open open closed) in the circuit to second control relay 693. In that same control relay circuit is switch 704 which is closed when the parison follower control switch is off. Thus at the run out of the established time of the timer 694 contacts 703 close to energize relay 693, producing the same result as the actuation of the follower down limit switch 452L.

The energization of relay 693 also energizes solenoid 587 (FIG. 24) which admits air into the upper end of the blower pipe cylinder 252 to move the blowpipe to its bottom limit where it projects through the central aperture 152 in the left die head 34L. Solenoid 639 is actuated by the closing of normally open contacts 688 which in turn are closed by the energizing of pipe down relay 697. Relay 697 is energized from terminal 667 by normally open second-control-relay 693 operated contacts 701 and a normally closed delayed opening switch 705.

The clamp 24L continues to close until rod 376 runs off normally closed blow limit switch 362 illustrated here as being open since at the start of the cycle the switch arm is still riding on rod 376 and until the molds meet and increase the pressure in duct 506 to actuate clamp stop close pressure switch 507. Switch element 665 of the pressure switch opens to de-energize the clamp close relay 668 and restore valve 494 to its no-flow position to stop further advance of the clamp. Closed switch 362 energizes the solenoid 706 of a blow timer 707 through lead 708. Energization of the solenoid 706 of the timer closes holding contacts 710 (open closed closed) in parallel with blow limit switch 362. The motor 711 of the blow timer 707 is energized through a normally open pressure switch 507 and holding contacts 714 closed by the energization of the blow timer solenoid 706. The actuation of the clamp stop close pressure switch 507 also closes switch 713 thereof. Current will then flow through switch 713 and normally open blow-timer-solenoid-operated contacts 714 (open closed open) to energize the timer motor 711. The closure of these two switches likewise energizes the air valve relay 715. Relay 715 operates the valve 558 which admits air into the cap 266 which covers the upper end of the blowpipe. The admitted air flows down the blowpipe and into the parison which is pinched shut around the pipe at its upper end and closed at its lower end and blows the walls thereof out into contact with the interior walls of the molds. Air continues to enter the parison for the set duration of the blow timer motor 711, in that contacts 714 are closed during only the duration of the set time interval. It is however desirable that the molds remain closed for a period after blowing in order to permit proper cooling of the blown article. The molds are usually formed of aluminum for optimum heat transfer and frequently have cooling coils secured to the outside thereof to accelerate the cooling but even so additional delay is often necessary. To achieve this delay I provide a third hold timer 718, the coil 719 of which is energized from terminal 646 through normally open blow-timer-707-operated contacts 720 (open open closed). Contacts 720 are thus closed at the runout of the set time interval of the timer motor 711 of blow timer 707. Energization of the hold timer solenoid 719 closes contact 722 which energizes hold timer motor 723.

Timer 718 is employed to energize a time delay relay 724 having normally open hold-timer-718-actuated contacts 726 (open closed closed) in series therewith. Actuation of timer 718 thus energizes relay 724.

Time delay relay 724 incorporates the delayed opening switch 705 in the circuit which energizes pipe down relay 697. Switch 705 is normally closed. Upon energization of relay 724 and after the expiration of the pre-determined time interval of the delayed opening contact 705, the circuit to pipe down relay 697 is broken, thereby de-energizing it. Contacts 688 are thereby de-energized and thus solenoid 689, whereby valve 550 (FIG. 24) is restored to its normal position and air under pressure is admitted to the rod end 554 of cylinder 252 to raise the blowpipe to its uppermost position.

It is necessary at this point to catch up with some of the mechanical operation. When last discussed, the clamp was at the dwell position, close to but still spaced from the parison and the parison was still in the process of formation with the accumulator continuing the parison extrusion and the parison follower carrying the bottom end of the parison down.

When the parison follower reaches the lower end of its travel, actuation of the follower stop down limit switch 452L stops the accumulator and the parison follower and starts the clamp moving again. Referring particularly to FIG. 13, the pneumatic cylinders under constant pressure bias the carriages 28 constantly outward. The outward bias is adjustably limited by nuts 391 on the threaded outer end 393 of push rod 388 meeting the tubular bumper 370. The outward end position of the carriage should be so determined that the parison extruded from the die head 34 just clears the beveled edges 338 of the top 324 and bottom 326 of the stationary mold half secured to the center plate 14. The dwell position of the clamp will likewise be adjusted to place the moving mold half just outside the parison.

As the clamp resumes closing the beveled edges of the moving die will collapse and flatten the parison until they have moved about half way into the parison. At this moment, wall 374 will meet nut 390 and the clamp will push the carriage with accumulator and die head to carry the parison into the stationary mold half to complete the mold closure. In this way the closure of the molds on the parison is symmetrical rather than unilateral and the thickness of the top and bottom ends of the closed parison will be uniform.

When the clamp opens, the carriages will be forced back outward by pneumatic cylinders 394 to follow nuts 390 until the outer stop nuts 391 engage the bumpers 370.

At the same time the closure of the clamp is signaled, the blowpipe descends into blowing position. Since it is pneumatically operated, however, it will reach its terminal blowing position well before the molds close and maintain a neck in the parison through which the parison may be blown.

The expiration of the time interval of hold timer 718 energizes clamp open relay 727 through timer-718-actuated contacts 728, normally closed contacts 730 and normally closed switch 731 of clamp stop open limit switch 366L (FIG. 23), illustrated as being held open here by rod 380. At this stage in the cycle, rod 380 is out of engagement with the switch arm of switch 366. Clamp open relay 727 incororates normally closed switch 730 and normally open holding switch 732 in a make-before-break relationship. Energization of relay 727 therefore closes holding contact 732 and opens normally closed contacts 730.

Energization of clamp open relay 727 closes contacts 734 which energizes solenoid 496 (FIG. 23) which moves valve 494 to direct pressure into the rod end 500 of the left clamp cylinder 29L to begin opening movement of the clamp.

Simultaneously accumulator open relay 735 is also energized through hold-timer-718-actuated switch 728 and normally closed accumulator stop open pressure switch 539. Energization of accumulator open relay 735 energizes solenoid 491 by closing contact 737, to move valve 487 (FIG. 23) to direct fluid into the rod end into the left accumulator cylinder 32L and begin its retraction.

Energization of clamp open relay 727 also closes normally open contact 738 to energize time delay relay 739. After a determined time interval, relay 739 closes normally open relay actuated contact 740 to close a circuit to cutter relay 742 through normally closed pipe-down-relay-697-actuated contact 743. Cutter relay 742 thus energizes solenoid 549 by closing contacts 744 to operate the cutter to sever the parison from the die head, valve 547 being operated to direct air pressure into the rod end of the cylinder 294 (FIG. 24). The presence of contact 743 in the circuit to the cutter relay 742 insures that the cutter will not operate until the blowpipe has been retracted.

Energization of the open clamp relay 727 and the open accumulator relay 735 opens respectively normally closed contacts 669 and 664 to break the circuit to terminal 667 to de-energize all of the timers and the second control relay 693 and restore them to starting condition. Contacts 688 are thereby de-energized and thus solenoid 689 whereby blowpipe down valve 550 (FIG. 24) is restored to its normal position and air under pressure is admitted to the rod end 554 of cylinder 252 to raise the blowpipe to its upper position. At the same time accumulator-open-relay-735-actuated contacts 650 in the circuit to the first control relay 651 are opened to break that circuit and de-energize relay 651.

Energization of the open accumulator relay 735 energizes a transfer relay 746 through normally open relay-735-operated contacts 747, closed selector switch 635d and normally closed contacts 748. Energization of transfer relay 746 is thereafter maintained by holding switch 749. The function of this relay is to energize the circuit of the right side of the machine for operation as will be later described. Contacts 748 are operated by the right side second control relay 753 which is energized by the right follower meeting its stop down limit switch 452R. On this occurrence, transfer relay 746 will be de-energized.

At this stage in the cycle the blowpipe has been retracted and the blowing air of course shut off, and the accumulator and clamp are opening. The clamp continues to open until rod 380 engages clamp stop open limit switch 366L. Switch 366L is thus moved to the illustrated position, opening switch 731 which breaks the circuit to clamp open relay 727 and therefore contacts 734 to de-energize solenoid 496 and restore valve 494 to no-flow position, stopping movement of the clamp.

At the same time the other switch 750 associated with limit switch 366 is moved to closure as illustrated.

I contemplate that the formed article will be removed from the molds manually. The movement of the movable mold half to the open position is, of course, to permit the withdrawal of the formed article from between the mold halves, and the extent of this movement, therefore, will be adjusted by appropriate positioning of the clamp stop open switch actuating rod 380 to provide sufficient clearance between the mold halves for this purpose. It is entirely feasible that automatic ejecting mechanism may be provided for the removal of the finished articles from the mold and, in the absence of the parison follower, there is space between the bottom columns 16 for the finished articles to fall through, but as such mechanisms are well known in the art, illustration and detailed description is believed unnecessary.

The return of the follower to its up position is, in the illustrated embodiment, controlled by a manual switch 751. If there should be a delay in taking the formed article out of the dies and the follower rise automatically, damage would certainly be done to the article and most probably to the follower mechanism also. Therefore normally open switch 751 is provided which the machine attendant may close only after he has cleared the dies. Closure of switch 751 establishes a circuit through that switch, closed switch 752 of the parison follower control 658, switch 750 of the clamp stop open limit switch 366L, normally closed contacts 754 which are actuated by the open accumulator relay 735 and normally closed switch 756 of the upper parison stop limit switch 452L to the follower up relay 757. The manual switch 751 has a follower-up-relay-actuated holding switch 758 in parallel therewith which holds the energization of the relay. Relay 757 closes contacts 759 which energizes solenoid 572 of valve 570 to direct the flow of fluid into the head end of the parison follower cylinder 422L. The presence of normally closed contacts 754 in the circuit to the follower up relay 757 ensures that that relay will not be energized until the accumulator has been fully retracted.

The follower continues to raise until the bottom block 466 on the cam rail 446 actuates follower stop up limit switch 452L. Such actuation opens switch 756 to de-energize the circuit to the follower up relay 757 and closes switch 760. The closure of switch 760 closes a circuit through clamp-open-relay-727-actuated, normally closed contacts 761 and switch 760 to energize safety relay 762. Relay 762 includes a pair of holding contacts 763 which maintain the energization of that relay.

The cycle of the left side has thus been completed and since the first control relay 651 and terminal 667 have been de-energized, that side will remain inactive until the right side of the machine signals the start of another cycle.

The right side of the machine has so similar a wiring diagram that a description as detailed as that of the left side is believed unnecessary. Parts in similar positions on the right and left sheets perform identical functions as regards the actual cycle of operation and the right side elements may therefore be identified by identity of location. Right side relays, timer, limit switches, etc., not mentioned in the discussion below will be identified by the equivalent left side numbers followed by an R.

Turning to the structure by which the right side cycle is started upon the conclusion of the left side cycle, it will be recalled that terminal 643 (right sheet) is energized through leads 605, terminal 606, lead 609, closed selector switch 635a, closed stop switch 639, lead 638, closed selector switch 635s, lead 640 and stop switch 642. Selector switch 635m is closed to connect the control ground 765 to ground 617. The right motor 478 is operating by virtue of a previous closure of switch 630. The operating cycle of the right side is readied by the closing of contacts 764 by transfer relay 763 which energizes right first control relay 767. Control relay 767 closes holding contacts 768 and a circuit is established for the duration of the cycle through the control relay through contacts 768, lead 770 and normally closed contacts 769 of the right accumulator open relay 773. The energization of right first control 767 closes normally open contacts 771 in the line to terminal 773 which energizes the right side cycle control circuit.

Normally open contacts 772 are by-passed by closed switch 774 of the right parison follower control 775 which is shown Off but will be turned to On. Normally closed contacts 776, 778, 656 and 779 and their equivalents in the left circuit are contacts to ensure that the right cycle will not start until the left cycle is concluded and vice versa and that the right (or left) circuit will be shut off when its cycle is concluded. Contacts 776 are opened by energization of the right clamp open relay 782, contacts 778 by the left accumulator open relay 735, contacts 656 by the left first control relay 651, contacts 779 by the right accumulator open relay 773 and contacts 781 by the right follower up relay 785. Thus terminal 773 will be energized only after, on the left side, the accumulator has been fully retracted and the first control relay 651 de-energized and, on the right side, when the clamp and accumulator are fully open and the follower fully up.

Assuming the above right side elements to be in proper condition, the left first control relay 651 is de-energized upon energizing the left accumulator open relay 735 by opening contacts 650. At the same time, contacts 656 will be closed but contacts 778 will be opened. This condition continues during the time of accumulator opening, until pressure switch 539 is actuated to de-energize the left accumulator relay 735. This closes contacts 778 and establishes the circuit to terminal 773. Upon this occurrence the right clamp close relay 785 is energized through normally open switch 786 of the right clamp dwell limit switch 364R held closed by its actuating rod until the dwell position is reached. Thereafter, the cycle continues as with the left side.

At the end of the right side cycle, the right transfer relay 788 is energized through the closure of contacts 789 by energization of the accumulator open relay 773. Selector switch 635m is closed and normally closed contacts 791 are operated by the left second control relay 693 which is de-energized. Transfer relay 788 closes contacts 792 which closes the circuit to the left first control relay 651 to energize it. At the same time the accumulator open relay 773 opens contacts 769 to de-energize the right first control relay 767 which, in turn, opens contacts 771 to de-energize terminal 773. The accumulator open relay also opens contacts 663 of terminal 667 and the start of a left side cycle.

The right accumulator then continues to open until it actuates pressure switch 539R which de-energizes right accumulator open switch which in turn closes contacts 662 to start the left cycle.

Left safety relay 762 (and its right side equivalent 794) insures against a recycling of the left side if the clamp is not fully open. When the follower is being used, energization of the follower up relay 757 may not occur until the clamp actuates the clamp stop open limit switch 366L at which time switch 750 is closed. The follower up relay 757 opens switch 666 to prevent energization of terminal 667. When the follower is not being used and the follower control switch is Off, switch element 659 which by-passes contacts 795 will be open. Contacts 795 are actuated by safety relay 762. The safety relay is energized through switch 760 of the follower stop up limit switch 452L and through normally closed contacts 761 of the clamp open relay 727. Switch 762 will be secured closed in such operation, during the opening of the clamp, so preventing energization of the terminal 667.

It is not believed necessary to describe in detail the other operations of which my machine is capable. The above-described continuous cycle is its primary purpose. Should it be desired, however, to trace out the circuitry for the other cycles, the selector switches are:

| 635 | a b | c d | f g | j k | m n | o p | r s | t |
|---|---|---|---|---|---|---|---|---|
| Single cycle, left end | c c | o o | o c | c o | o o | o o | o o | o |
| Single cycle, right end | o o | o o | o o | o o | c o | c o | c o | o |
| Single cycle, both ends | c c | o o | o o | c o | c o | o o | c c | c |
| Continuous run, left end | c c | o o | c c | c o | o o | o o | o o | o |
| Continuous run, right end | o o | o o | o o | o o | c o | c c | c o | o |
| Continuous run, both ends (described) | c c | c c | o o | o c | c c | o o | o c | c |

From the foregoing description it will be appreciated that I have devised a machine and method, which, for the first time as far as I know, permits a practical blow molding of large hollow plastic articles. In the pursuance of development I have devised a number of new and novel procedures and mechanisms, among which may be mentioned the concept of the accumulation of large quantities of plastic which such articles require for a rapid intermittent extrusion and molding thereof, the concept of the symmetrical closing of mold halves on the plastic column under the circumstances of a stationary mold half, and the mechanical concepts which go to make these characteristics possible.

There are many alternatives conceivable and feasible in the practice of my invention to the structure and method described. I would particularly like to point out that return of the parison follower to its up position can be integrated into the automatic cycle with the use of the manual switch 751. In such case, however, it would be well to provide safety mechanism such as an electric eye to detect the presence of an uncleared mold and halt the cycle.

Again, I have described either the parison follower or a timer as detecting the completion of the parison and signaling mold closure. Other methods such as a limit switch or an electric eye again could be used to detect complete parison development.

Other alternative practices and structure will undoubtedly suggest themselves and I therefore desire that my invention be regarded as being limited only as set forth in the following claims.

I claim:

1. A blow molding machine for forming hollow plastic articles which comprises a continuous source of plasticized polymer, at least two accumulators having ports therein connected to receive polymer from said source, a die head associated with each accumulator to receive polymer therefrom and extrude said polymer as a parison, means starting from a retracted position for expelling rapidly said polymer from each of said accumulators in rotation after the accumulation therein of a quantity of polymer, said expelling means also closing said ports upon movement away from said position, molds adapted to be closed about each of said parisons and means for delivering fluid under pressure into each of said parisons to expand said parisons against the inside walls of their molds.

2. In a blow bolding machine for forming hollow plastic articles, a movable plate having a first part of a mold secured thereto, a stationary plate having the other part of the mold mounted thereto facing said first part, means for moving said movable plate toward said stationary plate, control means to cause said movable plate to approach said stationary plate and to cause said die head to begin the formation of a parison, control means stopping said movable plate at a distance from said stationary plate so the parison narrowly avoids said mold parts until said parison is fully formed and control means responsive to the completion of said parison to cause said movable plate to move to close said mold parts on said parison.

3. In a blow molding machine for forming hollow plastic articles, stationary means mounting one part of a mold, movable means mounting the other part of the mold, means for moving said movable means toward said stationary means to close said mold parts together, a parison forming member situated to form a parison between said mold parts and adjacent said one part, control means for starting the formation of a parison from said member and closing movement of said movable means, control means stopping said movement at a point where said other mold part narrowly avoids said forming parison and control means responsive to the completion of said parison for resuming said closing movement.

4. A blow molding machine comprising horizontal parallel guide columns, a center plate transversely spanning said columns, clamps on either side of said center plate mounted for movement on said columns toward and away from said center plate, carriages mounted on the upper of said columns for movement toward and away from said center plate, accumulator cylinders mounted on said carriages having side inlet ports and end outlet ports a T-pipe assembly having telescoping arms interconnecting said inlet ports, die heads adapted to extrude downward a tubular parison between the center plate and said clamps carried by said carriages and connected to said outlet ports, blowpipes connected to a source of air under pressure, means for moving said blowpipes to extend below said die heads and retracting them upwardly therefrom and cutter means carried by said carriages and having blades movable across the bottom faces of said die heads to sever a parison therefrom.

5. In a blow molding machine having a source of plastic material and a die head for extruding a parison of said material downwardly, a horizontal plate constituting a support for the end of said material, a vertical hydraulic cylinder having a piston and rod, said rod mounting said support, a hydraulic circuit having a pump and a variable flow control valve including a cam follower actuator therein for lowering said support, said circuit lowering said support at about the rate of parison extrusion and a cam moving vertically with said rod and situated to engage said cam follower to decrease proportionately to the cam follower displacement the rate of lowering of said support.

6. A blow molding machine comprising a source of plasticized polymer, at least two accumulators having plungers therein connected to receive polymer from said source, means for advancing and retracting said plungers consecutively, one at a time, to extrude accumulated polymer therefrom and retract, said plungers prohibiting flow into their associated accumulators when away from retracted position, die heads having an annular orifice connected to each of said accumulators to receive polymer therefrom and extrude it downward as a tubular parison, said die heads each having a bore therethrough centrally of said orifice, molds associated with each of said die heads to close on the formed parison, a blow pipe retractably extending through each of said bores to said molds when said molds are closed, cutter means movable to sever said parison between said molds and said die heads, and means for retracting said blowpipes prior to severing movement of said cutter means.

7. A blow molding machine for forming plastic hollow articles which comprises a continuous source of plasticized polymer, a pair of accumulators having pistons therein movable between a retracted and an advanced position, said accumulators having longitudinally narrow polymer inlet ports therein immediately ahead of the retracted position of said pistons, said pistons being sufficiently long to cover said ports in said advanced position, duct means connecting said source to said ports, means for moving each of said pistons alternately from said retracted position to said advanced position and back to close the port associated therewith and divert the flow of polymer entirely to the accumulator containing the other piston, a die head associated with each accumulator to receive and extrude said polymer as a parison, molds adapted to be closed abut each of said parisons, and means for delivering fluid under pressure into each of said parisons to expand said parisons against the inside walls of their molds.

8. A blow molding machine for forming large hollow articles and including a die head arranged for the downward delivery of a tubular parison and a pair of mold halves relatively movable between a position spaced from each other to permit the removal of a formed article therefrom and a position closed on said parison, control means to begin the extrusion of a parison from said die head and relative closure of said mold halves, control means interrupting the relative closing movement of said mold halves at a point where said mold halves narrowly avoid said forming parison and control means responsive to the completion of said parison to resume the relative closing movement of said mold halves on said parison.

9. A blow molding machine for forming large hollow articles and including a die head arranged for the downward delivery of a tubular parison and a pair of mold halves relatively movable between a position spaced from each other to permit the removal of a formed article therefrom and a position closed on said parison, control means simultaneously to begin the extrusion of a parison from said die head and relative closure of said mold halves, control means including a switch positioned to be actuated when said mold halves have reached a position of narrowly avoiding said forming parison to interrupt further relative closure of said mold halves and control means responsive to the completion of said parison to resume the relative closing movement of said mold halves on said parison.

10. A blow molding machine for forming large hollow articles and including a die head arranged for the downward delivery of a tubular parison and a pair of mold halves relatively movable between a position spaced from each other to permit the removal of a formed article therefrom and a position closed on said parison, control means simultaneously to begin the extrusion of a parison from said die head and relative closure of said mold halves, control means interrupting the relative closing movement of said mold halves at a point where said mold halves narrowly avoid said forming parison and control means responsive to the expiration of a time interval sufficient for the completion of said parison to resume the relative closing movement of said mold halves on said parison.

11. A blow molding machine comprising a stationary center member, one half each of two molds secured to each side of said center member in back-to-back relation, movable members horizontally spaced from said center member on each side thereof, the other halves of said molds mounted to the inside face of each of said movable members to face said center member, means for moving said movable members toward and away from said center member for mold closure and opening, a source of plasticized polymer, a die head situated over each pair of molds, means for delivering said polymer from said source to each of said die heads, said die heads being adapted to extrude said polymer downwardly as a parison of predetermined diameter closely outside said stationary mold halves, said die heads being mounted for movement toward said stationary member, means associated with said movable members adapted to engage operatively said die heads upon movement of said movable members to a position where the die associated therewith has reached its terminal closed position with respect to said parison and move said die heads with said movable members toward said stationary member to mold closure, and means for returning said die heads upon opening of said molds.

12. The combination as set forth in claim 11 wherein said polymer delivering means includes collapsible ducts.

References Cited in the file of this patent

UNITED STATES PATENTS

| | | |
|---|---|---|
| 2,632,202 | Haines | Mar. 24, 1953 |
| 2,657,431 | Slaughter | Nov. 3, 1953 |
| 2,724,860 | Strong | Nov. 29, 1955 |
| 2,756,461 | Hadley | July 31, 1956 |
| 2,861,295 | Hagen et al. | Nov. 25, 1958 |
| 2,887,716 | Crosio | May 26, 1959 |
| 2,967,330 | Tommarchi | Jan. 10, 1961 |
| 2,994,103 | Schaich | Aug. 1, 1961 |

FOREIGN PATENTS

| | | |
|---|---|---|
| 1,029,586 | France | June 3, 1953 |
| 692,590 | Great Britain | June 10, 1953 |
| 781,560 | Great Britain | Aug. 21, 1956 |
| 789,816 | Great Britain | Jan. 29, 1958 |